US009654599B1

(12) United States Patent
Wheeler et al.

(10) Patent No.: US 9,654,599 B1
(45) Date of Patent: May 16, 2017

(54) AUTOMATIC CONCURRENT INSTALLATION REFRESH OF A LARGE NUMBER OF DISTRIBUTED HETEROGENEOUS RECONFIGURABLE COMPUTING DEVICES UPON A BOOTING EVENT

(71) Applicants: Brian Wheeler, Cherry hills, CO (US); Jeffrey Drazan, Woodside, CA (US)

(72) Inventors: Brian Wheeler, Cherry hills, CO (US); Jeffrey Drazan, Woodside, CA (US)

( * ) Notice: Subject to any disclaimer, the term of this patent is extended or adjusted under 35 U.S.C. 154(b) by 0 days.

(21) Appl. No.: 15/286,598

(22) Filed: Oct. 6, 2016

(51) Int. Cl.
- G06F 15/16 (2006.01)
- H04L 29/08 (2006.01)
- G06F 9/445 (2006.01)
- G06F 9/455 (2006.01)

(52) U.S. Cl.
CPC ............... H04L 67/34 (2013.01); G06F 8/61 (2013.01); G06F 9/45558 (2013.01); H04L 67/10 (2013.01); G06F 2009/4557 (2013.01); G06F 2009/45595 (2013.01)

(58) Field of Classification Search
CPC . H04L 67/34; H04L 67/10; G06F 8/61; G06F 9/45558; G06F 2009/4557; G06F 2009/45595
USPC .......................................................... 709/221
See application file for complete search history.

(56) References Cited

U.S. PATENT DOCUMENTS

| 7,069,293 | B2 | 6/2006 | Cox et al. |
| 7,210,143 | B2 | 4/2007 | Or et al. |
| 7,290,258 | B2 | 10/2007 | Steeb et al. |
| 7,890,543 | B2 | 2/2011 | Hunt et al. |
| 8,464,247 | B2 | 6/2013 | Laska et al. |

(Continued)

OTHER PUBLICATIONS

A Novel methodology for task distribution in heterogeneous reconfigurable computing system, by "Mahendra Vucha et al." International Journal of Embedded systems and Applications(IJESA) vol. 5, No. 1, Mar. 2015 http://airccse.org/journal/ijesa/papers/5115ijesa02.pdf.

(Continued)

Primary Examiner — Tauqir Hussain
(74) Attorney, Agent, or Firm — Raj Abhyanker, P.C.

(57) ABSTRACT

In one embodiment, a deployment server is communicatively coupled with many computing devices requiring updated system installations based on requirements of a session user of the computer devices. Upon booting, the computing devices send remote installation requests to the deployment server. The deployment server matches identification data of the computer devices with corresponding target installation profiles defined according to the requirements of the session user in an installation database. Identification data of a computing device comprises a programmable MAC address. Based on the target installation profiles, the deployment server causes remote installation instructions and files to be sent to the computer devices based on the corresponding target installation profiles. The many computing devices perform installation of heterogeneous operating systems, hypervisors, virtual machines, software and/or software license concurrently under direction of the deployment server based on the remote installation instructions and files. In another embodiment, the deployment server is PXE-compliant.

13 Claims, 6 Drawing Sheets

(56) References Cited

U.S. PATENT DOCUMENTS

| | | | |
|---|---|---|---|
| 8,555,273 B1 | 10/2013 | Chia et al. | |
| 8,934,378 B1* | 1/2015 | Novick | H04L 45/04 370/255 |
| 2003/0055919 A1 | 3/2003 | Fong et al. | |
| 2003/0097422 A1 | 5/2003 | Richards et al. | |
| 2004/0117413 A1* | 6/2004 | Brown | G06F 8/71 |
| 2004/0128375 A1 | 7/2004 | Rockwell | |
| 2006/0080518 A1* | 4/2006 | Dellacona | G06F 21/50 711/163 |
| 2006/0080540 A1* | 4/2006 | Arnon | G06F 21/53 713/182 |
| 2006/0143432 A1* | 6/2006 | Rothman | G06F 9/4416 713/2 |
| 2007/0008973 A1* | 1/2007 | Galea | G06F 9/4416 370/392 |
| 2007/0253437 A1* | 11/2007 | Radhakrishnan | G06F 15/16 370/401 |
| 2008/0003991 A1 | 1/2008 | Sievers et al. | |
| 2008/0046548 A1* | 2/2008 | Doran | H04L 12/66 709/222 |
| 2008/0155245 A1 | 6/2008 | Lipscombe et al. | |
| 2009/0222896 A1* | 9/2009 | Ichikawa | G06F 21/575 726/6 |
| 2010/0131084 A1 | 5/2010 | Van Camp | |
| 2010/0174810 A1* | 7/2010 | Cain | G06F 9/4416 709/222 |
| 2011/0320800 A1* | 12/2011 | Azam | G06F 9/4416 713/2 |
| 2012/0239729 A1* | 9/2012 | Hefter | G06F 9/4416 709/203 |
| 2013/0283193 A1* | 10/2013 | Griffin | G06F 3/1446 715/761 |
| 2016/0162303 A1* | 6/2016 | Guo | G06F 9/4416 713/2 |

OTHER PUBLICATIONS

Distributed Systems, by "INSUP LEE". Department of Computer and Information Science University of Pennsylvania. CIS 505, Spring 2007 http://www.cis.upenn.edu/~lee/07cis505/Lec/lec-ch1-DistSys-v4.pdf.

* cited by examiner

AUTOMATIC CONCURRENT INSTALLATION REFRESH OF A LARGE NUMBER OF DISTRIBUTED HETEROGENEOUS RECONFIGURABLE COMPUTING DEVICES UPON A BOOTING EVENT

FIELD OF TECHNOLOGY

This disclosure relates generally to computing, and, more particularly, to automatic concurrent installation refresh of a large number of distributed heterogeneous reconfigurable computing devices upon a booting event.

BACKGROUND

A server farm or server cluster may be a collection of computer servers maintained by an organization to supply server functionality far beyond the capability of a single machine. Server farms may consist of thousands of computers which may require a large amount of power to run and to keep cool. At the optimum performance level, a server farm may have enormous costs (both financial and environmental) associated with it. Server farms may have backup servers, which may take over the function of primary servers in the event of a primary-server failure. Server farms may be collocated with the network switches and/or routers which may enable communication between the different parts of the cluster and the users of the cluster. Server farmers may mount the computers, routers, power supplies, and related electronics on 19-inch racks in a server room or data center.

The computer servers of a server farm may serve multiple session users concurrently, and the session users may change over time. Each session user may be served in a session by a number of the computer servers configured as required by the session user. The processor requirement may be Alpha™, x86™, x8664™, IA64™, PDP-11™. VAX™, HP3000™, ARM™, MIPS™, POWerPC™, M88K™, and/or SuperH™, etc. The OS requirement may be Windows™, Linux™, DOS™, BSD™ Unix™, Mac OS™, OS X™, BeOS™, MorphOS™, OS/2™, Solaris™, SunOS™ Hyper-V™, Java Virtual Machine™, and/or Windows Server™, etc. Each computer server may be equipped with hypervisors and may function as a host machine to run a hypervisor to emulate the computing environment required by the session user. Hypervisors may be computer software, firmware and/or hardware that may create and run virtual machines. Each virtual machine may be a guest machine with a virtual operating system. Multiple instances of a variety of operating systems may share the virtualized hardware resources, such as Linux, Windows and OS X. The hypervisor may be a Type-1 (native or bare-metal) hypervisor such as Oracle VM Server for SPARC, Oracle VM Server for x86, the Citrix XenServer, Microsoft Hyper-V, and VMWare ESX/ESXi. The hypervisor may also be a Type-2 (hosted) hypervisor such as VMWare Workstation, VMware player, VirtualBox, Parallels Desktop for Mac and/or QEMU, etc.

During session change from one session user to a new session user, the computing system requirement may change and the associated computer servers may need to be reconfigured based on the new requirement from the new session user. The associated computer servers may need to be reconfigured manually by highly trained system administrators (system admin) one-at-a-time, which may be very tedious and time consuming. The down time of the computer servers may hurt business profit as the downed computer servers may not be productive. The down time of the computer servers may need to be minimized to improve profit margin. The time and man-time to reconfigure of the associated computer servers may need to be reduced. As there may be a large number of associated computer servers to be reconfigured, all the associated computer servers may need to be reconfigured automatically and concurrently without human intervention.

SUMMARY

Disclosed are a method, a device and/or a system of an automatic concurrent installation refresh of a large number of distributed heterogeneous reconfigurable computing devices upon a booting event.

In one aspect, a deployment server includes a processor and a memory communicatively coupled with the processor. The deployment server is communicatively coupled with a set of more than twenty distributed heterogeneous reconfigurable computing devices with corresponding processors and memories through a network. Each of the set of more than twenty distributed heterogeneous reconfigurable computing devices needs to automatically update installation of a heterogeneous operating system, a heterogeneous hypervisor, a heterogeneous virtual machine, a heterogeneous software, and/or a heterogeneous software license concurrently under the direction of the deployment server based on a requirement of a session user of the set of more than twenty distributed heterogeneous reconfigurable computing devices without manual intervention upon the occurrence of a booting event.

Each of the set of more than twenty distributed heterogeneous reconfigurable computing devices are configured with at least one remote virtual disk and at least one virtual network interface controller (NIC) based on the requirement of the session user of the set of more than twenty distributed heterogeneous reconfigurable computing devices. Each of the set of more than twenty distributed heterogeneous reconfigurable computing devices are identified by a distinct programmable media access control (MAC) address associated with at least one virtual NIC.

A set of instructions stored in the memory are executed by the processor to receive an identification data from each of the set of more than twenty distributed heterogeneous reconfigurable computing devices through the network. The set of instructions match the identification data with a target installation profile by searching an installation database. The target installation profile is defined based on the requirement of the session user. Further, set of instructions processes a remote installation request from each of the set of more than twenty distributed heterogeneous reconfigurable computing devices and causes to have remote installation instructions and remote installation files sent to each of the set of more than twenty distributed heterogeneous reconfigurable computing devices based on the target installation profile.

Each of the set of more than twenty distributed heterogeneous reconfigurable computing devices performs installation of the heterogeneous operating system, the heterogeneous hypervisor, the heterogeneous virtual machine, the heterogeneous software, and/or the heterogeneous software license concurrently under the direction of the deployment server based on the remote installation instructions and remote installation files.

Each of the set of more than twenty distributed heterogeneous reconfigurable computing devices may be freshly powered up before communicating the identification data and the remote installation request to the deployment server.

Further, each of the set of more than twenty distributed heterogeneous reconfigurable computing devices may perform a hardware reboot and/or a software reboot before communicating the identification data and the remote installation request to the deployment server. The identification data from the each of the set of more than twenty distributed heterogeneous reconfigurable computing devices may include the distinct programmable MAC address.

Each of the set of more than twenty distributed heterogeneous reconfigurable computing devices may perform booting and configured with at least one remote virtual disk and at least one virtual NIC with the distinct programmable MAC address according to a remote deployment boot profile. Each of the set of more than twenty distributed heterogeneous reconfigurable computing devices may send the identification data including the distinct programmable MAC address and the remote installation request to the deployment server through a set of BIOS instructions according to the remote deployment boot profile. Each of the set of more than twenty distributed heterogeneous reconfigurable computing devices may perform installation of the heterogeneous operating system, the heterogeneous hypervisor, the heterogeneous virtual machine, the heterogeneous software, and/or the heterogeneous software license concurrently under the direction of the deployment server based on at least one remote virtual disk and at least one virtual NIC with the distinct programmable MAC address.

A distinct MAC address may be chosen to be the distinct programmable MAC address of at least one virtual NIC configured during booting and the same distinct MAC address may be chosen to be a MAC address associated with the target installation profile in the installation database of the deployment server. Each of the set of more than twenty distributed heterogeneous reconfigurable computing devices may send the identification data and/or the remote installation request to the deployment server based on a stored IP address according to the remote deployment profile.

A particular computing device of the set of more than twenty distributed heterogeneous reconfigurable computing devices may not execute any existing operating system. The particular computing device may send the identification data and the remote installation request to the deployment server through the set of BIOS instructions. The heterogeneous operating system may be installed and executed. The heterogeneous hypervisor may be installed and executed. The virtual machine and the software may be installed in the particular computing device.

Agent software may be installed in each of the set of more than twenty distributed heterogeneous reconfigurable computing devices under the direction of the deployment server. The set of instructions of the deployment server may further communicate with the agent software of each of the set of more than twenty distributed heterogeneous reconfigurable computing devices occasionally to determine if each of the set of more than twenty distributed heterogeneous reconfigurable computing devices has been alive since the updated installation.

In another aspect, a PXE server includes a processor and a memory communicatively coupled with the processor. The PXE server is communicatively coupled with a set of more than twenty distributed PXE-compliant heterogeneous reconfigurable servers through a network. Each of the set of more than twenty distributed PXE-compliant heterogeneous reconfigurable servers needs to automatically update installation of a heterogeneous operating system, a heterogeneous hypervisor, a heterogeneous virtual machine, a heterogeneous software, and/or a heterogeneous software license contemporaneously under the direction of the PXE server based on a specification of a session user of the set of more than twenty distributed PXE-compliant heterogeneous reconfigurable servers without manual intervention upon the occurrence of a booting event.

Each of the set of more than twenty distributed PXE-compliant heterogeneous reconfigurable servers are configured with at least one remote virtual disk and at least one virtual network interface controller (NIC) based on the specification of the session user of the set of more than twenty distributed PXE-compliant heterogeneous reconfigurable servers. Further, each of the set of more than twenty distributed PXE-compliant heterogeneous reconfigurable servers are identified by a unique programmable media access control (MAC) address associated with at least one virtual NIC.

A set of instructions stored in the memory are executed by the processor to receive an identification data including the unique programmable MAC address from each of the set of more than twenty distributed PXE-compliant heterogeneous reconfigurable servers through the network. In addition, the set of instructions match the unique programmable MAC address with a target installation profile by searching a database. The target installation profile is defined based on the specification of the session user. The set of instructions processes a PXE boot request from each of the set of more than twenty distributed PXE-compliant heterogeneous reconfigurable servers. Furthermore, the set of instructions causes PXE installation instructions and PXE installation files be sent to each of the set of more than twenty distributed PXE-compliant heterogeneous reconfigurable servers based on the target installation profile. Each of the set of more than twenty distributed PXE-compliant heterogeneous reconfigurable servers conducts installation of the heterogeneous operating system, the heterogeneous hypervisor, the heterogeneous virtual machine, the heterogeneous software, and/or the heterogeneous software license contemporaneously under the direction of the PXE server based on the PXE installation instructions and PXE installation files.

Further, each of the set of more than twenty distributed PXE-compliant heterogeneous reconfigurable servers may be freshly powered up before communicating the identification data and the PXE boot request to the PXE server. Each of the set of more than twenty distributed PXE-compliant heterogeneous reconfigurable servers may perform a hardware reboot and/or a software reboot before sending the identification data and the PXE boot request to the PXE server.

Yet further, each of the set of more than twenty distributed PXE-compliant heterogeneous reconfigurable servers may perform booting and may be configured with at least one remote virtual disk and at least one virtual NIC with the unique programmable MAC address according to a remote deployment profile based on the specification of the session user. Each of the set of more than twenty distributed PXE-compliant heterogeneous reconfigurable servers may send the identification data including the unique programmable MAC address and the PXE boot request to the PXE server through a set of BIOS instructions according to the remote deployment profile. Each of the set of more than twenty distributed PXE-compliant heterogeneous reconfigurable servers may conduct installation of the heterogeneous operating system, the heterogeneous hypervisor, the heterogeneous virtual machine, the heterogeneous software and/or the heterogeneous software license contemporaneously under the direction of the PXE server based on at least one remote virtual disk and at least one virtual NIC with the unique programmable MAC address.

A unique MAC address may be chosen to be the unique programmable MAC address of at least one virtual NIC configured during booting. The same unique MAC address may be chosen to be a MAC address associated with the target installation profile in the database of the PXE server. Each of the set of more than twenty distributed PXE-compliant heterogeneous reconfigurable servers may send the identification data and the PXE boot request to the PXE server based on a stored IP address according to the remote deployment profile. A particular server of the set of more than twenty distributed PXE-compliant heterogeneous reconfigurable servers may not execute any existing operating system. The particular server may send the identification data and the PXE boot request to the PXE server through the set of BIOS instructions. The heterogeneous operating system may be installed and executed in the particular server. The heterogeneous hypervisor may be installed and executed in the particular server. Further, the virtual machine and the software may be installed in the particular server.

In yet another aspect, a method of a deployment server includes communicatively coupling the deployment server with a set of more than twenty distributed heterogeneous reconfigurable computing devices through a network. Each of the set of more than twenty distributed heterogeneous reconfigurable computing devices needs to automatically update installation of a heterogeneous operating system, a heterogeneous hypervisor, a heterogeneous virtual machine, a heterogeneous software, and/or a heterogeneous software license concurrently under the direction of the deployment server based on a requirement of a session user of the set of more than twenty distributed heterogeneous reconfigurable computing devices without manual intervention upon the occurrence of a booting event. Each of the set of more than twenty distributed heterogeneous reconfigurable computing devices are configured with at least one remote virtual disk and at least one virtual network interface controller (NIC) based on the requirement of the session user of the set of more than twenty distributed heterogeneous reconfigurable computing devices.

Each of the set of more than twenty distributed heterogeneous reconfigurable computing devices are identified by a distinct programmable media access control (MAC) address associated with at least one virtual NIC. The method of the deployment server includes receiving an identification data from each of the set of more than twenty distributed heterogeneous reconfigurable computing devices using the deployment server. Further, the method includes matching the identification data with a target installation profile by searching an installation database using the deployment server. The target installation profile is defined based on the requirement of the session user. In addition, the method of the deployment server includes processing a remote installation request from each of the set of more than twenty distributed heterogeneous reconfigurable computing devices using the deployment server.

Furthermore, the method causes remote installation instructions and remote installation files to be sent to each of the set of more than twenty distributed heterogeneous reconfigurable computing devices based on the target installation profile using the deployment server. Each of the set of more than twenty distributed heterogeneous reconfigurable computing devices carries out installation of the heterogeneous operating system, the heterogeneous hypervisor, the heterogeneous virtual machine, the heterogeneous software and/or the heterogeneous software license concurrently under the direction of the deployment server based on the remote installation instructions and remote installation files.

In a yet further aspect, a method of a PXE server includes communicatively coupling the PXE server with a set of more than twenty distributed PXE-compliant heterogeneous reconfigurable servers through a network. Each of the set of more than twenty distributed PXE-compliant heterogeneous reconfigurable servers needs to automatically update installation of a heterogeneous operating system, a heterogeneous hypervisor, a heterogeneous virtual machine, a heterogeneous software, and/or a heterogeneous software license contemporaneously under the direction of the PXE server based on a specification of a session user of the set of more than twenty distributed PXE-compliant heterogeneous reconfigurable servers without manual intervention upon the occurrence of a booting event. Each of the set of more than twenty distributed PXE-compliant heterogeneous reconfigurable servers are configured with at least one remote virtual disk and at least one virtual network interface controller (NIC) based on the specification of the session user of the set of more than twenty distributed PXE-compliant heterogeneous reconfigurable servers. Each of the set of more than twenty distributed PXE-compliant heterogeneous reconfigurable servers are identified by a unique programmable media access control (MAC) address associated with at least one virtual NIC.

The method of a PXE server includes receiving an identification data including the unique programmable MAC address from each of the set of more than twenty distributed PXE-compliant heterogeneous reconfigurable servers through the network.

Further, the method of a PXE server includes matching the unique programmable MAC address with a target installation profile by searching a database. The target installation profile is defined based on the specification of the session user. In addition, the method of a PXE server includes processing a PXE boot request from each of the set of more than twenty distributed PXE-compliant heterogeneous reconfigurable servers. Furthermore, the method of the PXE server causes PXE installation instructions and PXE installation files to be sent to each of the set of more than twenty distributed PXE-compliant heterogeneous reconfigurable servers based on the target installation profile.

Each of the set of more than twenty distributed PXE-compliant heterogeneous reconfigurable servers effects installation of the heterogeneous operating system, the heterogeneous hypervisor, the heterogeneous virtual machine, the heterogeneous software and/or the heterogeneous software license contemporaneously under the direction of the PXE server based on the PXE installation instructions and PXE installation files.

BRIEF DESCRIPTION OF THE FIGURES

The embodiments of this disclosure are illustrated by way of example and not limited in the Figures of the accompanying drawings, in which like references indicate similar elements and in which.

Figure 1:
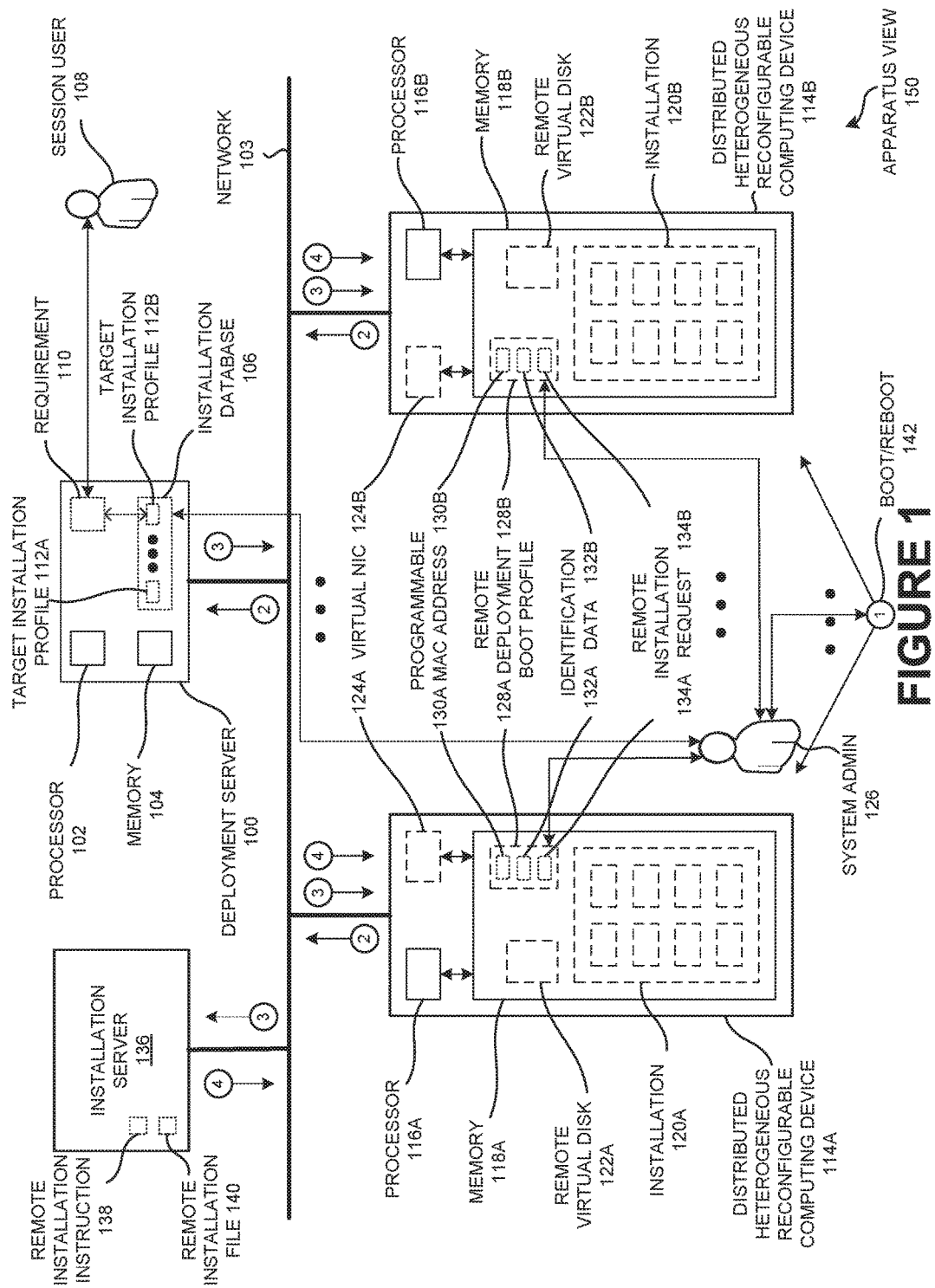
FIG. 1 is an apparatus view illustrating a deployment server configuring a set of more than twenty distributed heterogeneous reconfigurable computing devices with a remote virtual disk and a virtual network interface controller (NIC) based on a requirement of a session user, according to one embodiment.

Other features of the present embodiments will be apparent from accompanying drawings and from the disclosure that follows.

DETAILED DESCRIPTION

Disclosed are a method, a device and/or a system of an automatic concurrent installation refresh of a large number of distributed heterogeneous reconfigurable computing devices upon a booting event, according to one embodiment.

In one embodiment, a deployment server 100 includes a processor 102 and a memory 104 communicatively coupled with the processor 102. The deployment server 100 is communicatively coupled with a set of more than twenty distributed heterogeneous reconfigurable computing devices 114A, 114B with corresponding processors 102 and memories 104 through a network 103.

Each of the set of more than twenty distributed heterogeneous reconfigurable computing devices 114A, 114B needs to automatically update installation 120A, 120B of a heterogeneous operating system 200, a heterogeneous hypervisor 202, a heterogeneous virtual machine 204, a heterogeneous software 206, and/or a heterogeneous software license 208 concurrently under the direction of the deployment server 100 based on a requirement 110 of a session user 108 of the set of more than twenty distributed heterogeneous reconfigurable computing devices 114A, 114B without manual intervention upon the occurrence of a booting event (e.g., using boot/reboot 142 of the deployment server 100), according to one embodiment.

Each of the set of more than twenty distributed heterogeneous reconfigurable computing devices 114A, 114B are configured with at least one remote virtual disk 122A, 122B and at least one virtual network interface controller (NIC) 124 based on the requirement 110 (e.g., using target installation profile 112A, 112B of the deployment server 100) of the session user 108 of the set of more than twenty distributed heterogeneous reconfigurable computing devices 114A, 114B. Each of the set of more than twenty distributed heterogeneous reconfigurable computing devices 114A, 114B are identified by a distinct programmable media access control (MAC) address 130 associated with at least one virtual NIC 212, according to one embodiment.

A set of instructions stored in the memory 104 are executed by the processor 102 to receive an identification data 132A, 132B from each of the set of more than twenty distributed heterogeneous reconfigurable computing devices 114A, 114B through the network 103. The set of instructions match the identification data 132A, 132B with a target installation profile 112A, 112B by searching an installation database 106. The target installation profile 112A, 112B is defined based on the requirement 110 of the session user 108, according to one embodiment.

Further, the set of instructions processes a remote installation request 134A, 134B from each of the set of more than twenty distributed heterogeneous reconfigurable computing devices 114A, 114B and causes to have remote installation instructions 138 and remote installation files 140 sent to each of the set of more than twenty distributed heterogeneous reconfigurable computing devices 114A, 114B based on the target installation profile 112A, 112B, according to one embodiment.

Each of the set of more than twenty distributed heterogeneous reconfigurable computing devices 114A, 114B performs installation of the heterogeneous operating system 200, the heterogeneous hypervisor 202, the heterogeneous virtual machine 204, the heterogeneous software 206, and/or the heterogeneous software license 208 concurrently under the direction of the deployment server 100 based on the remote installation instructions 138 and remote installation files 140, according to one embodiment.

Each of the set of more than twenty distributed heterogeneous reconfigurable computing devices 114A, 114B may be freshly powered up before communicating the identification data 132A, 132B and the remote installation request 134A, 134B to the deployment server 100. Further, each of the set of more than twenty distributed heterogeneous reconfigurable computing devices 114A, 114B may perform a hardware reboot and/or a software 206 reboot before communicating the identification data 132A, 132B and the remote installation request 134A, 134B to the deployment server 100. The identification data 132A, 132B from the each of the set of more than twenty distributed heterogeneous reconfigurable computing devices 114A, 114B may include the distinct programmable MAC address 130A, 130B, according to one embodiment.

Each of the set of more than twenty distributed heterogeneous reconfigurable computing devices 114A, 114B may perform booting and configured with at least one remote virtual disk 122A, 122B and at least one virtual NIC 212 with the distinct programmable MAC address 130A, 130B according to a remote deployment boot profile 128A, 128B. Each of the set of more than twenty distributed heterogeneous reconfigurable computing devices 114A, 114B may send the identification data 132A, 132B including the distinct programmable MAC address 130A, 130B and the remote installation request 134A, 134B to the deployment server 100 through a set of BIOS instructions according to the remote deployment boot profile 128A, 128B, according to one embodiment.

Each of the set of more than twenty distributed heterogeneous reconfigurable computing devices 114A, 114B may perform installation 120A, 120B of the heterogeneous operating system 200, the heterogeneous hypervisor 202, the heterogeneous virtual machine 204, the heterogeneous software 206, and/or the heterogeneous software license 208 concurrently under the direction of the deployment server 100 based on at least one remote virtual disk 214 and at least one virtual NIC 124A, 124B with the distinct programmable MAC address 130A, 130B, according to one embodiment.

A distinct MAC address may be chosen to be the distinct programmable MAC address 130A, 130B of at least one virtual NIC 124A, 124B configured during booting and the same distinct MAC address may be chosen to be a MAC address associated with the target installation profile 112A, 112B in the installation database 106 of the deployment server 100. Each of the set of more than twenty distributed heterogeneous reconfigurable computing devices 114A, 114B may send the identification data 132A, 132B and/or the remote installation request 134A, 134B to the deployment server 100 based on a stored IP address according to the remote deployment profile, according to one embodiment.

A particular computing device of the set of more than twenty distributed heterogeneous reconfigurable computing devices 114A, 114B may not execute any existing operating system. The particular computing device may send the identification data 132A, 132B and the remote installation request 134A, 134B to the deployment server 100 through the set of BIOS instructions. The heterogeneous operating system 200 may be installed and executed. The heterogeneous hypervisor 202 may be installed and executed. The virtual machine and the software 206 may be installed in the particular computing device, according to one embodiment.

An agent software (e.g., software 206) may be installed in each of the set of more than twenty distributed heterogeneous reconfigurable computing devices 114A, 114B under the direction of the deployment server 100. The set of instructions of the deployment server 100 may further communicate with the agent software (e.g., software 206) of each of the set of more than twenty distributed heterogeneous reconfigurable computing devices 114A, 114B occasionally to determine if each of the set of more than twenty distributed heterogeneous reconfigurable computing devices 114A, 114B has been alive since the updated installation, according to one embodiment.

In another embodiment, a PXE server 300 includes a processor 302 and a memory 304 communicatively coupled with the processor 302. The PXE server 300 is communicatively coupled with a set of more than twenty distributed PXE-compliant heterogeneous reconfigurable servers (e.g., distributed PXE-compliant heterogeneous reconfigurable server 314) through a network 103, according to one embodiment.

Each of the set of more than twenty distributed PXE-compliant heterogeneous reconfigurable servers (e.g., distributed PXE-compliant heterogeneous reconfigurable server 314) needs to automatically update installation 320 of a heterogeneous operating system 200, a heterogeneous hypervisor 202, a heterogeneous virtual machine 204, a heterogeneous software 206, and/or a heterogeneous software license 208 contemporaneously under the direction of the PXE server 300 based on a specification of a session user 108 of the set of more than twenty distributed PXE-compliant heterogeneous reconfigurable servers (e.g., distributed PXE-compliant heterogeneous reconfigurable server 314) without manual intervention upon the occurrence of a booting event (e.g., boot/reboot 342), according to one embodiment.

Each of the set of more than twenty distributed PXE-compliant heterogeneous reconfigurable servers (e.g., distributed PXE-compliant heterogeneous reconfigurable server 314) are configured with at least one remote virtual disk 322 and at least one virtual network interface controller (NIC) (e.g., virtual NIC 324) based on the specification of the session user 108 of the set of more than twenty distributed PXE-compliant heterogeneous reconfigurable servers (e.g., distributed PXE-compliant heterogeneous reconfigurable server 314), according to one embodiment.

Further, each of the set of more than twenty distributed PXE-compliant heterogeneous reconfigurable servers (e.g., distributed PXE-compliant heterogeneous reconfigurable server 314) are identified by a unique programmable media access control (MAC) address (e.g., programmable MAC address 330) associated with at least one virtual NIC (e.g., virtual NIC 324), according to one embodiment.

A set of instructions stored in the memory 304 are executed by the processor 302 to receive an identification data 332 including the unique programmable MAC address 330 from each of the set of more than twenty distributed PXE-compliant heterogeneous reconfigurable servers (e.g., distributed PXE-compliant heterogeneous reconfigurable server 314) through the network 103, according to one embodiment.

In addition, the set of instructions match the unique programmable MAC address 330 with a target installation profile (e.g., target installation profile 312A, 312B) by searching a database 306. The target installation profile (e.g., target installation profile 312A, 312B) is defined based on the specification of the session user 108. The set of instructions processes a PXE boot request from each of the set of more than twenty distributed PXE-compliant heterogeneous reconfigurable servers (e.g., distributed PXE-compliant heterogeneous reconfigurable server 314), according to one embodiment.

Furthermore, the set of instructions causes PXE installation instructions 338 and PXE installation files 340 sent to each of the set of more than twenty distributed PXE-compliant heterogeneous reconfigurable servers (e.g., distributed PXE-compliant heterogeneous reconfigurable server 314) based on the target installation profile (e.g., target installation profile 312A, 312B), according to one embodiment.

Each of the set of more than twenty distributed PXE-compliant heterogeneous reconfigurable servers (e.g., distributed PXE-compliant heterogeneous reconfigurable server 314) conducts installation 320 of the heterogeneous operating system 200, the heterogeneous hypervisor 202, the heterogeneous virtual machine 204, the heterogeneous software 206, and/or the heterogeneous software license 208 contemporaneously under the direction of the PXE server 300 based on the PXE installation instructions 338 and PXE installation files 340, according to one embodiment.

Each of the set of more than twenty distributed PXE-compliant heterogeneous reconfigurable servers (e.g., distributed PXE-compliant heterogeneous reconfigurable server 314) may be freshly powered up before communicating the identification data 332 and the PXE boot request to the PXE server 300. Further, each of the set of more than twenty distributed PXE-compliant heterogeneous reconfigurable servers (e.g., distributed PXE-compliant heterogeneous reconfigurable server 314) may perform a hardware reboot (e.g., boot/reboot 342) and/or a software reboot (e.g., boot/reboot 342) before sending the identification data 332 and the PXE boot request to the PXE server 300, according to one embodiment.

In addition, each of the set of more than twenty distributed PXE-compliant heterogeneous reconfigurable servers (e.g., distributed PXE-compliant heterogeneous reconfigurable server 314) may perform booting (e.g., boot/reboot 342) and may be configured with at least one remote virtual disk (e.g., virtual disk 322) and at least one virtual NIC (e.g., virtual NIC 324) with the unique programmable MAC address 330 according to a remote deployment profile 328 based on the specification of the session user 108, according to one embodiment.

Each of the set of more than twenty distributed PXE-compliant heterogeneous reconfigurable servers (e.g., distributed PXE-compliant heterogeneous reconfigurable server 314) may send the identification data 332 including the unique programmable MAC address 330 and the PXE boot request to the PXE server 300 through a set of BIOS instructions according to the remote deployment boot profile (e.g., remote deployment profile 328), according to one embodiment.

Each of the set of more than twenty distributed PXE-compliant heterogeneous reconfigurable servers (e.g., distributed PXE-compliant heterogeneous reconfigurable server 314) may conduct installation 320 of the heterogeneous operating system 200, the heterogeneous hypervisor 202, the heterogeneous virtual machine 204, the heterogeneous software 206 and/or the heterogeneous software license 208 contemporaneously under the direction of the PXE server 300 based on at least one remote virtual disk (e.g., virtual disk 322) and at least one virtual NIC (e.g., virtual NIC 324) with the unique programmable MAC address 330, according to one embodiment.

Further, a unique MAC address 330 may be chosen to be the unique programmable MAC address 330 of at least one virtual NIC (e.g., virtual NIC 324) configured during booting (e.g., using boot/reboot 342). The same unique MAC address 330 may be chosen to be a MAC address 330 associated with the target installation profile (e.g., target installation profile 312A, 312B) in the database 306 of the PXE server 300, according to one embodiment.

Each of the set of more than twenty distributed PXE-compliant heterogeneous reconfigurable servers (e.g., distributed PXE-compliant heterogeneous reconfigurable server 314) may send the identification data 332 and/or the PXE boot request to the PXE server 300 based on a stored IP address according to the remote deployment profile 328. In addition, a particular server of the set of more than twenty distributed PXE-compliant heterogeneous reconfigurable servers (e.g., distributed PXE-compliant heterogeneous reconfigurable server 314) may not execute any existing operating system, according to one embodiment.

The particular server may send the identification data 332 and the PXE boot request to the PXE server 300 through a set of BIOS instructions. The heterogeneous operating system 200 may installed and executed in the particular server. The heterogeneous hypervisor 202 may be installed and executed in the particular server. The virtual machine (e.g., heterogeneous virtual machine 204) and the software 206 may be installed in the particular server, according to one embodiment.

In another example embodiment, a method of a deployment server 100 includes communicatively coupling the deployment server 100 with a set of more than twenty distributed heterogeneous reconfigurable computing devices (e.g., distributed heterogeneous reconfigurable computing device 114A, 114B) through a network 103.

Each of the set of more than twenty distributed heterogeneous reconfigurable computing devices (e.g., distributed heterogeneous reconfigurable computing device 114A, 114B) needs to automatically update installation (e.g., installation 120A, 120B) of a heterogeneous operating system 200, a heterogeneous hypervisor 202, a heterogeneous virtual machine 204, a heterogeneous software 206, and/or a heterogeneous software license 208 concurrently under the direction of the deployment server 100 based on a requirement of a session user 108 of the set of more than twenty distributed heterogeneous reconfigurable computing devices (e.g., distributed heterogeneous reconfigurable computing device 114A, 114B) without manual intervention upon the occurrence of a booting (e.g., using boot/reboot 142) event, according to one embodiment.

Each of the set of more than twenty distributed heterogeneous reconfigurable computing devices (e.g., distributed heterogeneous reconfigurable computing device 114A, 114B) are configured with at least one remote virtual disk (e.g., remote virtual disk 122A, 122B) and at least one virtual network interface controller (NIC) (e.g., virtual NIC 124A, 124B) based on the requirement of the session user 108 of the set of more than twenty distributed heterogeneous reconfigurable computing devices (e.g., distributed heterogeneous reconfigurable computing device 114A, 114B), according to one embodiment.

Each of the set of more than twenty distributed heterogeneous reconfigurable computing devices (e.g., distributed heterogeneous reconfigurable computing device 114A, 114B) are identified by a distinct programmable media access control (MAC) address (e.g., programmable MAC address 130A, 130B) associated with at least one virtual NIC (e.g., virtual NIC 124A, 124B). The method of the deployment server 100 includes receiving an identification data (e.g., identification data 132A, 132B) from each of the set of more than twenty distributed heterogeneous reconfigurable computing devices (e.g., distributed heterogeneous reconfigurable computing device 114A, 114B) using the deployment server 100, according to one embodiment.

Further, the method includes matching the identification data (e.g., identification data 132A, 132B) with a target installation profile (e.g., target installation profile 112A, 112B) by searching an installation database 106 using the deployment server 100. The target installation profile (e.g., target installation profile 112A, 112B) is defined based on the requirement of the session user 108. In addition, the method of the deployment server 100 includes processing a remote installation request (e.g., installation request 134A, 134B) from each of the set of more than twenty distributed heterogeneous reconfigurable computing devices (e.g., distributed heterogeneous reconfigurable computing device 114A, 114B) using the deployment server 100, according to one embodiment.

Furthermore, the method causes remote installation instructions 138 and remote installation files 140 to be sent to each of the set of more than twenty distributed heterogeneous reconfigurable computing devices (e.g., distributed heterogeneous reconfigurable computing device 114A, 114B) based on the target installation profile (e.g., target installation profile 112A, 112B) using the deployment server 100, according to one embodiment.

Each of the set of more than twenty distributed heterogeneous reconfigurable computing devices (e.g., distributed heterogeneous reconfigurable computing device 114A, 114B) carries out installation (e.g., installation 120A, 120B) of the heterogeneous operating system 200, the heterogeneous hypervisor 202, the heterogeneous virtual machine 204, the heterogeneous software 206 and/or the heterogeneous software license 208 concurrently under the direction of the deployment server 100 based on the remote installation instructions 138 and remote installation files 140, according to one embodiment.

The identification data (e.g., identification data 132A, 132B) from the each of the set of more than twenty distributed heterogeneous reconfigurable computing devices (e.g., distributed heterogeneous reconfigurable computing device 114A, 114B) may include the distinct programmable MAC address (e.g., programmable MAC address 130A, 130B) and/or an IP address, according to one embodiment.

In more example embodiment, a method of a PXE server 300 includes communicatively coupling the PXE server 300 with a set of more than twenty distributed PXE-compliant heterogeneous reconfigurable servers (e.g., distributed PXE-compliant heterogeneous reconfigurable server 314) through a network 103, according to one embodiment.

Each of the set of more than twenty distributed PXE-compliant heterogeneous reconfigurable servers (e.g., distributed PXE-compliant heterogeneous reconfigurable server 314) needs to automatically update installation 320 of a heterogeneous operating system 200, a heterogeneous hypervisor 202, a heterogeneous virtual machine 204, a heterogeneous software 206, and/or a heterogeneous software license 208 contemporaneously under the direction of the PXE server 300 based on a specification of a session user 108 of the set of more than twenty distributed PXE-compliant heterogeneous reconfigurable servers (e.g., distributed PXE-compliant heterogeneous reconfigurable server 314) without manual intervention upon the occurrence of a booting event (e.g., using boot/reboot 342), according to one embodiment.

Each of the set of more than twenty distributed PXE-compliant heterogeneous reconfigurable servers (e.g., distributed PXE-compliant heterogeneous reconfigurable server 314) are configured with at least one remote virtual disk 322 and at least one virtual network interface controller (NIC) (e.g., virtual NIC 324) based on the specification of the session user 108 of the set of more than twenty distributed PXE-compliant heterogeneous reconfigurable servers (e.g., distributed PXE-compliant heterogeneous reconfigurable server 314), according to one embodiment.

Each of the set of more than twenty distributed PXE-compliant heterogeneous reconfigurable servers (e.g., distributed PXE-compliant heterogeneous reconfigurable server 314) are identified by a unique programmable media access control (MAC) address 330 associated with at least one virtual NIC (e.g., virtual NIC 324), according to one embodiment.

The method of the PXE server 300 includes receiving an identification data 332 including the unique programmable MAC address 330 from each of the set of more than twenty distributed PXE-compliant heterogeneous reconfigurable servers (e.g., distributed PXE-compliant heterogeneous reconfigurable server 314) through the network 103. Further, the method of the PXE server 300 includes matching the unique programmable MAC address 330 with a target installation profile (e.g., target installation profile 312A, 312B) by searching a database 306. The target installation profile (e.g., target installation profile 312A, 312B) is defined based on the specification of the session user 108, according to one embodiment.

In addition, the method of the PXE server 300 includes processing a PXE boot request from each of the set of more than twenty distributed PXE-compliant heterogeneous reconfigurable servers (e.g., distributed PXE-compliant heterogeneous reconfigurable server 314). Furthermore, the method of the PXE server 300 causes PXE installation instructions 338 and PXE installation files 340 to be sent to each of the set of more than twenty distributed PXE-compliant heterogeneous reconfigurable servers (e.g., distributed PXE-compliant heterogeneous reconfigurable server 314) based on the target installation profile (e.g., target installation profile 312A, 312B).

Each of the set of more than twenty distributed PXE-compliant heterogeneous reconfigurable servers (e.g., distributed PXE-compliant heterogeneous reconfigurable server 314) effects installation 320 of the heterogeneous operating system 200, the heterogeneous hypervisor 202, the heterogeneous virtual machine 204, the heterogeneous software 206 and/or the heterogeneous software license 208 contemporaneously under the direction of the PXE server 300 based on the PXE installation instructions 338 and PXE installation files 340, according to one embodiment.

FIG. 1 is an apparatus view 150 illustrating a deployment server 100 configuring a set of more than twenty distributed heterogeneous reconfigurable computing devices 114A, 114B with a remote virtual disk 122 and a virtual network interface controller (NIC) 124 based on a requirement 110 of a session user 108, according to one embodiment.

Particularly, FIG. 1 illustrates a deployment server 100, a processor 102, a network 103, a memory 104, an installation database 106, a session user 108, a requirement 110, a target installation profile 112A, 112B, distributed heterogeneous reconfigurable computing device 114A, 114B, processor 116A, 116B, memory 118A, 118B, installation 120A, 120B, remote virtual disk 122A, 122B, virtual NIC 124A, 124B, system admin 126, remote deployment boot profile 128A, 128B, programmable MAC address 130A, 130B, identification data 132A, 132B, remote installation request 134A, 134B, installation server 136, remote installation instruction 138, remote installation file 140, and boot/reboot 142, according to one embodiment.

The deployment server 100 may be an instance of a computer program that accepts and responds to the requests made by another program to process setting up of a new computer and/or a system to the point where it is ready for productive work in a live environment (e.g., distributed heterogeneous reconfigurable computing devices 114A, 114B). The deployment server 100 may encompass all the processes involved in getting new software (e.g., heterogeneous software 206, heterogeneous operating system 200, heterogeneous hypervisor 202, heterogeneous virtual machine 204, virtual NIC 212, virtual disk 214, etc.) and/or hardware (e.g., programmable MAC address 130) up and running properly in its environment, including installation, configuration, running, testing, and/or making necessary changes. The deployment server 100 may act as a centralized configuration manager, grouping together and collectively managing any number of distributed heterogeneous reconfigurable computing devices 114A, 114B, according to one embodiment.

The deployment server 100 may be used to distribute content and configurations (e.g., deployment applications, target installation profile 112A, 112B) to deployment clients (e.g., distributed heterogeneous reconfigurable computing device 114A, 114B), grouped into server classes, according to one embodiment.

The deployment server 100 may put the distributed heterogeneous reconfigurable computing device 114A, 114B into production providing services as needed, and/or made available for use (e.g., 'read to go', 'ready for production', 'serving applications'), according to one embodiment The deployment server 100 may install OS, install applications, configure network settings (e.g., programmable MAC address 130, IP address, default gateway, etc.), patch the server into the LAN switch, configure appropriate firewall rules to allow required access to the server, and add server into monitoring and management platforms in each of the distributed heterogeneous reconfigurable computing device 114A, 114B, according to one embodiment.

The processor 102 may be a logic circuitry that responds to and processes the basic instructions that drives the deployment server 100. The processor 102 may perform arithmetical, logical, input/output (I/O) and other basic instructions that are passed from an operating system (OS) of the deployment server 100. The processor 102 may perform arithmetical and logical instructions of the operating system (OS) of the deployment server 100 to create and/or configure a target installation profile 112 for each of the distributed heterogeneous reconfigurable computing device 114A, 114B based on the requirement 110 of the session user 108, according to one embodiment.

The memory 104 may be an electronic holding place for instructions and data that deployment server's 100 microprocessor can reach quickly. The memory 104 may be any physical device capable of storing information temporarily and/or permanently in the deployment server 100, according to one embodiment. A set of instructions may be stored in the memory 104 to be executed by the processor 102. The processor 102 may receive an identification data 132 from each of the set of more than twenty distributed heterogeneous reconfigurable computing devices 114A, 114B through the network 103 upon booting and/or rebooting (e.g., using boot/reboot 142), according to one embodiment.

The processor 102 may match the identification data 132 with a target installation profile 112 by searching an installation database 106. The target installation profile 112 may be defined based on the requirement 110 of the session user 108. The processor 102 may execute the set of instructions to process the remote installation request 134 from each of the set of more than twenty distributed heterogeneous reconfigurable computing devices 114A, 114B, according to one embodiment.

Further, the processor 102 may execute the set of instructions to cause to have the installation server 136 send remote installation instructions 138 and remote installation files 140 to each of the set of more than twenty distributed heterogeneous reconfigurable computing devices 114A, 114B based on the target installation profile 112A, 112B, according to one embodiment.

The network 103 may be a series of points and/or nodes (set of more than twenty distributed heterogeneous reconfigurable computing devices 114A, 114B) interconnected by communication paths. The network 103 of deployment server 100 may interconnect with other networks and contain subnetworks. Each of the set of more than twenty distributed heterogeneous reconfigurable computing devices 114A, 114B may be linked together and interconnected by communication paths to the deployment server 100 and installation server 136 through the network 103. The network 103 may be a local-area networks (LANs), a wide-area networks (WANs), a campus-area networks (CANs), a metropolitan-area networks MANs), and/or a home-area networks (HANs). In one example embodiment, the network 103 may be cloud-based network.

The installation database 106 may be a collection of information for making a program ready for execution that is organized so that it can easily be accessed, managed, and/or updated by the processor 102 of the deployment server 100. The installation database 106 may be a specialized program responsible for doing whatever is needed for installation of target installation profile 112B defined based on the requirement 110 of the session user 108. The installation 120A, 120B may be part of a larger software deployment process of the deployment server 100, according to one embodiment.

The session user 108 may be an entity and/or an authority (e.g., a person) that uses the deployment server 100. Based on a requirement 110 of the session user 108, the deployment server 100 may direct the installation server 136 to install and/or automatically update installation 120A, 120B of the heterogeneous operating system 200, heterogeneous hypervisor 202, heterogeneous virtual machine 204, heterogeneous software 206 and/or heterogeneous software license 208 in each of the distributed heterogeneous reconfigurable computing device 114A, 114B concurrently without any manual intervention upon the occurrence of a booting event (e.g., boot/reboot 142), according to one embodiment.

The session user 108 may request (e.g., requirement 110) the system admin 126 that a number of computing devices be installed with various operating systems and no. of softwares and keep it ready when booted up. The system admin 126 of the deployment server 100 may create a template (e.g., target installation profile 112) for the session user 108 based on his requirement 110. The system admin 126 may create the template for the session user 108 for most common things the session user 108 may want to do, including installing VMware, Xen, Docker, and/or blank OS in each of the distributed heterogeneous reconfigurable computing device 114A, 114B concurrently, according to one embodiment.

The system admin 126 of the deployment server 100 may create big MAC pool for each of the distributed heterogeneous reconfigurable computing device 114A, 114B and so when a particular distributed heterogeneous reconfigurable computing device 114A, 114B comes online and if it is in profile template (e.g., target installation profile 112) the system admin 126 made, the deployment server 100 may pick up a MAC address (e.g., programmable MAC address 130A, 130B) in that pool. The deployment server 100 may be able to see when the particular distributed heterogeneous reconfigurable computing device 114A, 114B turns on, according to one embodiment.

The system admin 126 of the deployment server 100 may be able to install everything the session user 126 needed automatically with no user intervention. The session user 126 may need not do anything, but simply plug his new rack of equipment in and within few minutes he may have VMware, Xen, and docker ready to go in each of the distributed heterogeneous reconfigurable computing device 114A, 114B, according to one embodiment.

The deployment server 100 may program each of the CPU of the distributed heterogeneous reconfigurable computing device 114A, 114B, to have any MAC (e.g., programmable MAC address 130A, 130B) and IP address (e.g., identification data 132A, 132B) the session user 126 wants. The deployment server 100 may virtualize this connection into a virtual card. This virtual NIC 212 may be actually sitting inside the CPU. The deployment server 100 may create the NIC inside the CPU of the distributed heterogeneous reconfigurable computing device 114A, 114B, according to one embodiment.

The deployment server 100 may feed any incoming MAC address (e.g., programmable MAC address 130A, 130B) into the virtual NIC 212. This virtual NIC 212 may have an IP Address (e.g., programmable MAC address 130A, 130B) associated with it and this virtual NIC 212 may process whatever information is coming through based on that IP address. The deployment server 100 may install any software, OS, storage, network and/or any server database in the distributed heterogeneous reconfigurable computing device 114A, 114B based on the session user's 126 requirement 110, according to one embodiment.

The system admin 126 of the deployment server 100 may rewrite the BIOS for the template profile (e.g., target installation profile 112) based on the session user's 126 requirement 110. The system admin 126 of the deployment server 100 may leave the distributed heterogeneous reconfigurable computing devices 114A, 114B at a particular profile (e.g., target installation profile 112A, 112B) when turned off and it will revert back to same profile when turned on again. But if system admin 126 of the deployment server 100 switches it to different profile, it will shut off, turn back on, and reinstall the different installation 120A, 120B (e.g., target installation profile 112A, 112B) based on the session user's 126 new and/or updated requirement 110, according to one embodiment.

The requirement 110 may be a quality or performance demanded of the deployment server 100 in accordance with certain fixed regulations. The set of more than twenty distributed heterogeneous reconfigurable computing devices 114A, 114B may automatically update installation 120A, 120B of the heterogeneous operating system 200, heterogeneous hypervisor 202, heterogeneous virtual machine 204, heterogeneous software 206 and heterogeneous software license 208 concurrently under the direction of the deployment server 100 based on the requirement 110 of a session user 108. Each session user 108 may be served in a session by set of more than twenty distributed heterogeneous reconfigurable computing devices 114A, 114B configured as required by the session user 108, according to one embodiment.

The target installation profile 112A, 112B may be the objective arithmetical, or graphic summary and/or analysis of a process, activity, relationship, or set of characteristics of the distributed heterogeneous reconfigurable computing device 114A, 114B. The target installation profile 112A, 112B may provide configuration features and functions for a specific type of requirement 110 of a session user 108 as a single download containing a particular core, contributed modules, themes, and/or pre-defined configurations. The target installation profile 112A, 112B may make it possible to quickly set up a complex, use-specific computing environment in fewer steps by the deployment server 100 without manual intervention than if installing and configuring elements individually, according to one embodiment.

The target installation profile 112A, 112B may be an XML document that tells the software how to set up various aspects of Providence at the time of its installation. The target installation profile 112A, 112B may enable the deployment server 100 to configure nearly every aspect of the various cataloging interfaces in the distributed heterogeneous reconfigurable computing device 114A, 114B before the session user 108 begins using the system, according to one embodiment.

The deployment server 100 may generate and define controlled vocabularies, create standards-compliant set-ups, define and label metadata fields, including the allowable kinds of values for each (e.g., a numerical versus a time-based metadata value), bundle the fields together for easy metadata entry, specify the method of metadata entry (e.g., a text entry field or a drop-down menu), combine metadata elements on different screens for workflow management, delineate and describe the relationships between all of the various types of objects, entities, occurrences, lots, sets, etc. in the system, set the logins for different user types, establish what screens appear according to what the session user 108 is cataloging, and configure the display of search results and data exports for each of the distributed heterogeneous reconfigurable computing device 114A, 114B, according to one embodiment.

The distributed heterogeneous reconfigurable computing device 114A, 114B may be a computer architecture combining some of the flexibility of software with high performance of hardware by processing with very flexible high speed computing fabrics like field-programmable gate arrays (FPGAs) in a distributed system using more than one kind of processor (e.g., processor 116A, 116B) or cores. The distributed heterogeneous reconfigurable computing device 114A, 114B may have the ability to make substantial changes to the datapath itself in addition to the control flow, possibility to adapt the hardware during runtime by "loading" a new circuit on the reconfigurable fabric, according to one embodiment.

The distributed heterogeneous reconfigurable computing device 114A, 114B may gain performance or energy efficiency not just by adding the same type of processors, but by adding dissimilar coprocessors (e.g., processor 116A, 116B, a combination of two and/or more of different processors, such as, Alpha™, x86™, x86-64™, IA-64™, PDP-11™. VAX™, HP3000™, ARM™, MIPS™, PowerPC™, M88K™, and/or SuperH™, etc.), incorporating specialized processing capabilities to handle particular tasks as configured by the deployment server 100, according to one embodiment.

The processor 116A, 116B may be a logic circuitry that responds to and processes the basic instructions that drives the distributed heterogeneous reconfigurable computing device 114A, 114B. The processor 116A, 116B may perform arithmetical, logical, input/output (I/O) and other basic instructions that are passed from an operating system (OS) of the distributed heterogeneous reconfigurable computing device 114A, 114B, according to one embodiment.

The memory 118A, 118B may be an electronic holding place for instructions and data that distributed heterogeneous reconfigurable computing device's 114A, 114B microprocessor can reach quickly. The memory 104 may be any physical device capable of storing information temporarily and/or permanently in the distributed heterogeneous reconfigurable computing device 114A, 114B, according to one embodiment.

The installation 120A, 120B may be a computer program (including device drivers and plugins), and/or the act of making the program ready for execution by the deployment server 100. The installation 120A, 120B process may be a specialized program responsible for doing whatever is needed for making the distributed heterogeneous reconfigurable computing device 114A, 114B ready for execution. The installation 120A, 120B may be part of a larger software deployment process of the distributed heterogeneous reconfigurable computing device 114A, 114B, according to one embodiment.

The installation 120A, 120B may involve code being copied/generated from the installation files (e.g., remote installation file 140) to new files on the local computer (e.g., distributed heterogeneous reconfigurable computing device's 114A, 114B) for easier access by the operating system (e.g., heterogeneous operating system 200) of the distributed heterogeneous reconfigurable computing device 114A, 114B, according to one embodiment.

The remote virtual disk 122A, 122B may be software components that emulate an actual disk storage device in the distributed heterogeneous reconfigurable computing device 114A, 114B without any physical access of the session user 108, according to one embodiment.

The remote virtual disk 122A, 122B may be common components of virtual machines (e.g., heterogeneous virtual machine 204) in hardware virtualization. The remote virtual disk 122A, 122B (also known as a virtual drive or a RAM drive) may be a file that represents as a physical disk drive to a guest operating system (e.g., heterogeneous operating system 200). The file may be configured on the host (e.g., distributed heterogeneous reconfigurable computing device's 114A, 114B) and also on a remote file system. The system admin 126 may install a new operating system onto the virtual disk without repartitioning the physical disk and/or rebooting the host machine (e.g., distributed heterogeneous reconfigurable computing device 114A, 114B), according to one embodiment.

The virtual NIC 124A, 124B may be a network interface controller working in a virtual machine (e.g., heterogeneous virtual machine 204). The virtual NIC 124A, 124B (e.g., a network interface card, network adapter, LAN adapter, physical network interface) may be a computer hardware component that connects distributed heterogeneous reconfigurable computing device 114A, 114B to a computer network 103, according to one embodiment.

The system admin 126 may be a person who is responsible for the upkeep, configuration, and reliable operation of the distributed heterogeneous reconfigurable computing device 114A, 114B (e.g., multi-user computers, servers), according to one embodiment.

The system admin 126 seeks to ensure that the uptime, performance, resources, and security of distributed heterogeneous reconfigurable computing device 114A, 114B he or she manages meet the needs of the session user 108, without exceeding the budget. To meet these requirements 110, a system admin 126 may acquire, install, and/or upgrade computer components and software; provide routine automation; maintain security policies; and troubleshoot each of the distributed heterogeneous reconfigurable computing devices 114A, 114B for projects, according to one embodiment.

The remote deployment boot profile 128A, 128B may be brief description of the characteristics of configuration file to load the first piece of software that starts on the distributed heterogeneous reconfigurable computing device 114A, 114B and complete other configuration steps on the distributed heterogeneous reconfigurable computing device 114A, 114B, according to one embodiment.

The remote deployment boot profile 128A, 128B may enable start of deploying the applications in the distributed heterogeneous reconfigurable computing device 114A, 114B based on the requirements 110 of the session user 108 after each boot/reboot 142. Each of the set of more than twenty distributed heterogeneous reconfigurable computing devices 114A, 114B may perform booting and may be configured with at least one remote virtual disk 122 and at least one virtual NIC 124 with the distinct programmable MAC address 130 according to the remote deployment boot profile 128A, 128B, according to one embodiment.

The programmable MAC address 130A, 130B may be a set of coded instructions that enables a machine, (e.g., distributed heterogeneous reconfigurable computing device 114A, 114B) to perform a desired sequence of operations to assign a unique identifier to network interfaces for communications at the data link layer of a network segment, according to one embodiment.

The identification data 132A, 132B may be distinct pieces of information, including unique programmable MAC address 130A, 100B, usually formatted in a special way that the deployment server 100 may receive from each of the distributed heterogeneous reconfigurable computing device 114A, 114B through the network 103, according to one embodiment.

The identification data 132A, 132B from the each of the set of more than twenty distributed heterogeneous reconfigurable computing devices 114A, 114B may include the distinct programmable MAC address 130A, 130B. Each of the set of more than twenty distributed heterogeneous reconfigurable computing devices 114A, 114B may perform a hardware reboot and/or a software reboot before communicating the identification data 132A, 132B and the remote installation request 134A, 134B to the deployment server 100, according to one embodiment.

The remote installation request 134A, 134B may be the solicitation of making the program ready for execution by the deployment server 100 through a network 103. Each of the set of more than twenty distributed heterogeneous reconfigurable computing devices 114 may send the identification data 132 including the distinct programmable MAC address 130 and the remote installation request 134 to the deployment server 100 through a set of BIOS instructions according to the remote deployment boot profile 128, according to one embodiment.

The installation server 136 may be a server that allows PXE BIOS-enabled computers, (e.g., distributed heterogeneous reconfigurable computing device 114A, 114B) to remotely execute boot environment variables. The installation server 136 may be used to create installation images of operating systems and/or computer configurations, which can be used to demonstrate the installation process to users whose machines have been granted access to the installation server 136, according to one embodiment.

The remote installation instruction 138 may be the basic command given by the installation server 136 to the processor 116A, 116B of the distributed heterogeneous reconfigurable computing device 114A, 114B to perform a particular task of installing and/or automatically updating installation of a heterogeneous operating system 200, a heterogeneous hypervisor 202, a heterogeneous virtual machine 204, a heterogeneous software 206 and a heterogeneous software license 208 concurrently under the direction of the deployment server 100 based on the requirement 110 of the session user 108, according to one embodiment.

The remote installation file 140 may be a collection of data or information from the installation server 136 sent to the processor 116A, 116B of the distributed heterogeneous reconfigurable computing device 114A, 114B to perform a particular task to install a particular program/file in the distributed heterogeneous reconfigurable computing device 114A, 114B, according to one embodiment.

The boot/reboot 142 may be the process of loading the first piece of software that starts a computer, (e.g., distributed heterogeneous reconfigurable computing device 114A, 114B). The boot/reboot 142 may be the first piece of software loaded during the boot process to prepare the system for running all other programs, according to one embodiment.

The reboot 142 may be the process of restarting a computer (e.g., distributed heterogeneous reconfigurable computing device 114A, 114B) and reloading the operating system. The most common reasons to reboot are because the installation of new software or hardware based on the requirement of the session user 108 and/or a new session user 108. The session user 108 may reconfigure each of the distributed heterogeneous reconfigurable computing devices 114A, 114B with flexible amount of virtual NIC (e.g., 124A), programmable MAC address (e.g., 130A) and flexible amount of virtual disk (122A) of SAN (storage area network 220) and rebooting the system (e.g., using boot/reboot 142), according to one embodiment.

The deployment server 100 may include a processor 102 and a memory 104. The memory 104 may be communicatively coupled with the processor 102. The deployment server 100 may include an installation database 106 communicatively coupled with the processor 102. The deployment server 100 may be communicatively coupled with a set of more than twenty distributed heterogeneous reconfigurable computing devices 114A, 114B with corresponding processors and memories through a network 103, according to one embodiment.

In circle "1", system admin 126 may key-in a command to perform software boot/reboot 142. In circle "2", each set of more than twenty distributed heterogeneous reconfigurable computing devices 114A, 114B may send an identification data 132 and an installation request 134 concurrently to the deployment server 100. The deployment server 100 may check the unique programmable MAC address 130 in each of the identification data 132 to locate the corresponding target installation profile 112 in the installation database 106. Based on each target installation profile 112, the deployment server 100 may send direction in circle "3". The direction may cause remote installation instructions 138 and remote installation files 140 to be sent to the individual server computers 114 concurrently in circle "4". Each of the set of more than twenty distributed heterogeneous reconfigurable computing devices 114A, 114B may perform the installation of the corresponding heterogeneous hypervisors 202 and heterogeneous operating systems 200, according to one embodiment.

Figure 2:
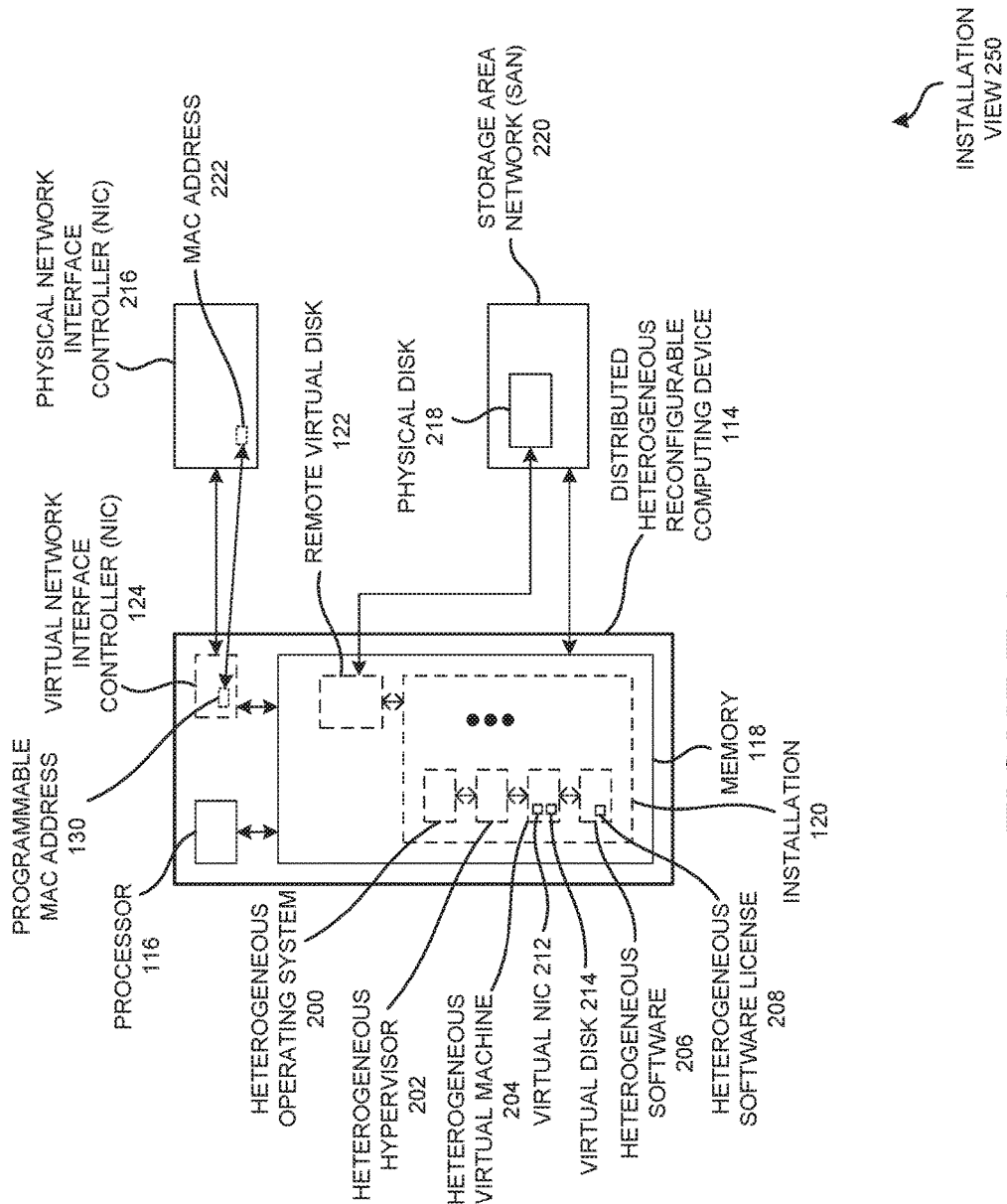
FIG. 2 is an installation view illustrating the installation and execution of a heterogeneous operating system and a heterogeneous hypervisor along with installation of virtual machine and software by the deployment server of FIG. 1 when a particular computing device of the set of more than twenty distributed heterogeneous reconfigurable computing devices does not execute any existing operating system, according to one embodiment.

FIG. 2 is an installation view 250 illustrating the installation and execution of a heterogeneous operating system 200 and a heterogeneous hypervisor 202 along with installation of virtual machine and software by the deployment server 100 of FIG. 1 when a particular computing device of the set of more than twenty distributed heterogeneous reconfigurable computing devices 114A, 114B does not execute any existing operating system, according to one embodiment.

Particularly, FIG. 2 builds on FIG. 1 and further adds, a heterogeneous operating system 200, a heterogeneous hypervisor 202, a heterogeneous virtual machine 204, heterogeneous software 206, a heterogeneous software license 208, NIC 212, virtual disk 214, physical network interface controller (NIC) 216, physical disk 218, storage area network 220, and a MAC address 222, according to one embodiment. The heterogeneous operating system 200 may be a software program that enables the computer hardware of the set of more than twenty distributed heterogeneous reconfigurable computing devices 114 to communicate and operate with the computer software (e.g., heterogeneous software 206) of the set of more than twenty distributed heterogeneous reconfigurable computing devices 114 using more than one kind of processor or cores. The heterogeneous operating system 200 may add dissimilar coprocessors, usually incorporating specialized processing capabilities to handle particular tasks. The heterogeneous operating system 200 may deploy multiple types of processing elements (e.g., virtual hardware, virtual software, virtual machine) within a single workflow, and allow each to perform the tasks to which it is best suited, according to one embodiment.

The heterogeneous operating system 200 may be combination of two and/or more of different operating system working in a heterogeneous computing environment, e.g., Windows™, Linux™, DOS™, BSD™, Unix™, Mac OS™, OS X™ BeOS™, MorphOS™, OS/2™, Solaris™, SunOS™, Hyper-V™, Java Virtual Machine™, and/or Windows Server™, according to one embodiment.

The set of more than twenty distributed heterogeneous reconfigurable computing devices 114 may be a product and/or part of a "heterogeneous network," consisting of different manufacturers' products that can "interoperate." The set of more than twenty distributed heterogeneous reconfigurable computing devices 114 may have standards-conforming hardware and software interfaces used in common by different products, thus allowing them to communicate with each other, according to one embodiment.

The heterogeneous hypervisor 202 may be a hardware virtualization technique that allows multiple guest operating systems (OS) (e.g., heterogeneous operating system 200) to run on a single host system (e.g., set of more than twenty distributed heterogeneous reconfigurable computing devices 114) at the same time using more than one kind of processor or cores by adding dissimilar coprocessors and incorporating specialized processing capabilities to handle particular tasks, according to one embodiment.

The guest OS (e.g., heterogeneous operating system 200), may share the hardware of the host computer (e.g., set of more than twenty distributed heterogeneous reconfigurable computing devices 114), such that each operating system appears to have its own processor (e.g., processor 116), memory (e.g., memory 118) and other hardware resources (e.g., virtual network interface controller NIC 124, programmable MAC address 130, etc.), according to one embodiment.

The heterogeneous hypervisor 202 may allow multiple operating systems to share a single hardware host of the set of more than twenty distributed heterogeneous reconfigurable computing devices 114. Each operating system may have the host's processor, memory, and other resources all to itself. The heterogeneous hypervisor 202 may control the host processor and resources, allocating what is needed to each operating system in turn and making sure that the guest operating systems (e.g., heterogeneous virtual machine 204) cannot disrupt each other, according to one embodiment.

The deployment of heterogeneous hypervisor 202 may provide more flexibility and ease in monitoring and maintenance tasks of the infrastructure. The heterogeneous hypervisor 202 may present the guest operating systems (e.g., heterogeneous operating system 200) with a virtual operating platform and manage the execution of the guest operating systems (e.g., heterogeneous operating system 200). Multiple instances of a variety of operating systems may share the virtualized hardware resources: for example, Linux, Windows, and OS X instances can all run on a single physical x86 machine (e.g., set of more than twenty distributed heterogeneous reconfigurable computing devices 114), according to one embodiment.

The heterogeneous virtual machine 204 may be a software computer that, like a physical computer, runs an operating system and applications using more than one kind of processor (e.g., processor 116) and/or cores. The heterogeneous virtual machine 204 may include a set of specification and configuration files and is backed by the physical resources of a host (e.g., set of more than twenty distributed heterogeneous reconfigurable computing devices 114). Each heterogeneous virtual machine 204 may represent a single computer within the network 103 and may reside on an ESX and/or ESXi server (e.g., set of more than twenty distributed heterogeneous reconfigurable computing devices 114), according to one embodiment.

The heterogeneous software 206 may be computer instructions and/or data to run the operating system and applications in the set of more than twenty distributed heterogeneous reconfigurable computing devices 114 using more than one kind of processor (e.g., processor 116) and/or cores, according to one embodiment.

The heterogeneous software license 208 may be a document that provides legally binding guidelines for the use and distribution of software (e.g., heterogeneous software 206) among the set of more than twenty distributed heterogeneous reconfigurable computing devices 114, according to one embodiment.

The heterogeneous software license 208 may provide end users (e.g., system admin 126, session user 108) with the right to one or more copies of the software without violating copyrights. The heterogeneous software license 208 may define the responsibilities of the parties entering into the license agreement and may impose restrictions on how the heterogeneous software 206 can be used. Software licensing terms and conditions may include fair use of the software 206, the limitations of liability, warranties and disclaimers and protections if the software or its use infringes on the intellectual property rights of others, according to one embodiment.

When a particular computing device of the set of more than twenty distributed heterogeneous reconfigurable computing devices 114A, 114B does not execute any existing operating system, the deployment server 100 may use other installed component to install and execute heterogeneous operating system 200 and heterogeneous hypervisor 202 along with installation of virtual machine (e.g., heterogeneous virtual machine 204) and software (e.g., heterogeneous software 206) in the particular computing device of the set of more than twenty distributed heterogeneous reconfigurable computing devices 114A, 114B, according to one embodiment.

In another example embodiment, the other installed component may be file-based resources, such as virtual hard disks, templates, and/or ISO images. The other installed component may include virtual hard disks, virtual floppy disks, ISO images, and scripts, virtual machine templates, hardware profiles, guest operating system profiles, which can be used to create virtual machines (e.g., heterogeneous virtual machine 204) and stored virtual machines that are not currently in use, etc.

The virtual NIC 212 may be a program (instead of a physical network adapter) that allows the set of more than twenty distributed heterogeneous reconfigurable computing devices 114 to connect to a network 103. The virtual NIC 212 may also be used to connect set of more than twenty distributed heterogeneous reconfigurable computing devices 114 on a local area network (LAN) to a larger network such as the Internet or a collection of LANs. The virtual NIC 212 that is bridged to a physical NIC may be a true Ethernet bridge. The virtual NIC 212 packets may be sent on the wire with its own unique MAC address 222, according to one embodiment.

Each heterogeneous virtual machine 204 of the distributed heterogeneous reconfigurable computing device 114A, 114B may represent a single computer within the network 103 and resides on an ESX or ESXi server, according to one embodiment.

The virtual disk 214 may be a file that represent as a physical disk drive to a guest operating system (e.g., heterogeneous operating system 200). The virtual disk 214 may be configured on the host (e.g., the set of more than twenty distributed heterogeneous reconfigurable computing devices 114) and also on a remote file system. The virtual disk 214 may be a software component that emulates an actual disk storage device, according to one embodiment.

The physical network interface controller (NIC) 216 (NIC, also known as a network interface card, network adapter, LAN adapter or physical network interface, etc.) may be a computer hardware component that connects the set of more than twenty distributed heterogeneous reconfigurable computing devices 114 to a computer network 103, according to one embodiment.

The physical network interface controller (NIC) 216 may provide the set of more than twenty distributed heterogeneous reconfigurable computing devices 114 with a dedicated, full-time connection to a network 103 of the deployment server 100. The personal computers and workstations on a local area network (LAN) may contain a physical network interface controller (NIC) 216 specifically designed for the LAN transmission technology, according to one embodiment.

The physical disk 218 (e.g., logical disk, logical volume or virtual disk) may be a virtual device that provides an area of usable storage capacity (e.g., storage area network 220) on one or more physical disk drive(s) in a computer system of the deployment server 100, according to one embodiment.

The storage area network 220 may be a network which provides access to consolidated, block level data storage to the set of more than twenty distributed heterogeneous reconfigurable computing devices 114. The storage area network 220 may be a used to enhance storage devices, such as disk arrays, tape libraries, and optical jukeboxes, accessible to the deployment server 100 so that the set of more than twenty distributed heterogeneous reconfigurable computing devices 114 appear to the operating system as locally attached devices, according to one embodiment.

The storage area network 220 may be a high-speed network of storage devices that also connects those storage devices with the deployment server 100. The storage area network 220 may provide block-level storage that can be accessed by the applications running on any networked servers (e.g., deployment server 100, installation server 136). The storage area network 220 may include tape libraries and disk-based devices, like RAID hardware, according to one embodiment.

The storage area network 220 may be a specialized, high-speed network that provides block-level network access to storage to the set of more than twenty distributed heterogeneous reconfigurable computing devices 114 of the deployment server 100. The storage area network 220 may be composed of hosts, switches, storage elements, and storage devices that are interconnected using a variety of technologies, topologies, and protocols. The storage area network 220 may also span multiple sites, according to one embodiment.

The storage area network 220 may be used for improving application availability (e.g., multiple data paths), enhancing application performance (e.g., off-load storage functions, segregate networks, etc.), increasing storage utilization and effectiveness (e.g., consolidate storage resources, provide tiered storage, etc.), and improving data protection and security of the set of more than twenty distributed heterogeneous reconfigurable computing devices 114, according to one embodiment.

The MAC address 222 of a computer may be a unique identifier assigned to network interfaces for communications at the data link layer of a network segment by the deployment server 100. The MAC addresses 222 may be used as a network address for most IEEE 802 network technologies, including Ethernet and WiFi. The deployment server 100 may choose a distinct MAC address 222 to be the distinct programmable MAC address 130 of at least one virtual NIC 124 configured during booting. The same distinct MAC address 222 may be chosen to be a MAC address associated with the target installation profile 112 in the installation database 106 of the deployment server 100, according to one embodiment.

When a particular computing device (e.g., 114A, 114B) of the set of more than twenty distributed heterogeneous reconfigurable computing devices 114 does not execute any existing operating system (e.g., heterogeneous operating system 200), the particular computing device (e.g., 114A, 114B) may send the identification data 132 (e.g., MAC address 222) and the remote installation request (e.g., installation request 134A, 134B) to the deployment server 100 through the set of BIOS instructions. The heterogeneous operating system 200 and/or heterogeneous hypervisor 202 may be installed and executed by the deployment server 100. Further, the virtual machine 204 and the software 204 may be installed in the particular computing device (e.g., 114A, 114B) by the deployment server 100, according to one embodiment.

The deployment server 100 may direct the installation server 136 to install an agent software (e.g., a heterogeneous software 206) in each of the set of more than twenty distributed heterogeneous reconfigurable computing devices 114A, 114B. The set of instructions of the deployment server 100 may communicate with the agent software (e.g., a heterogeneous software 206) of each of the set of more than twenty distributed heterogeneous reconfigurable computing devices 114A, 114B occasionally to determine if each of the set of more than twenty distributed heterogeneous reconfigurable computing devices 114A, 114B has been alive since the updated installation, according to one embodiment.

Figure 3:
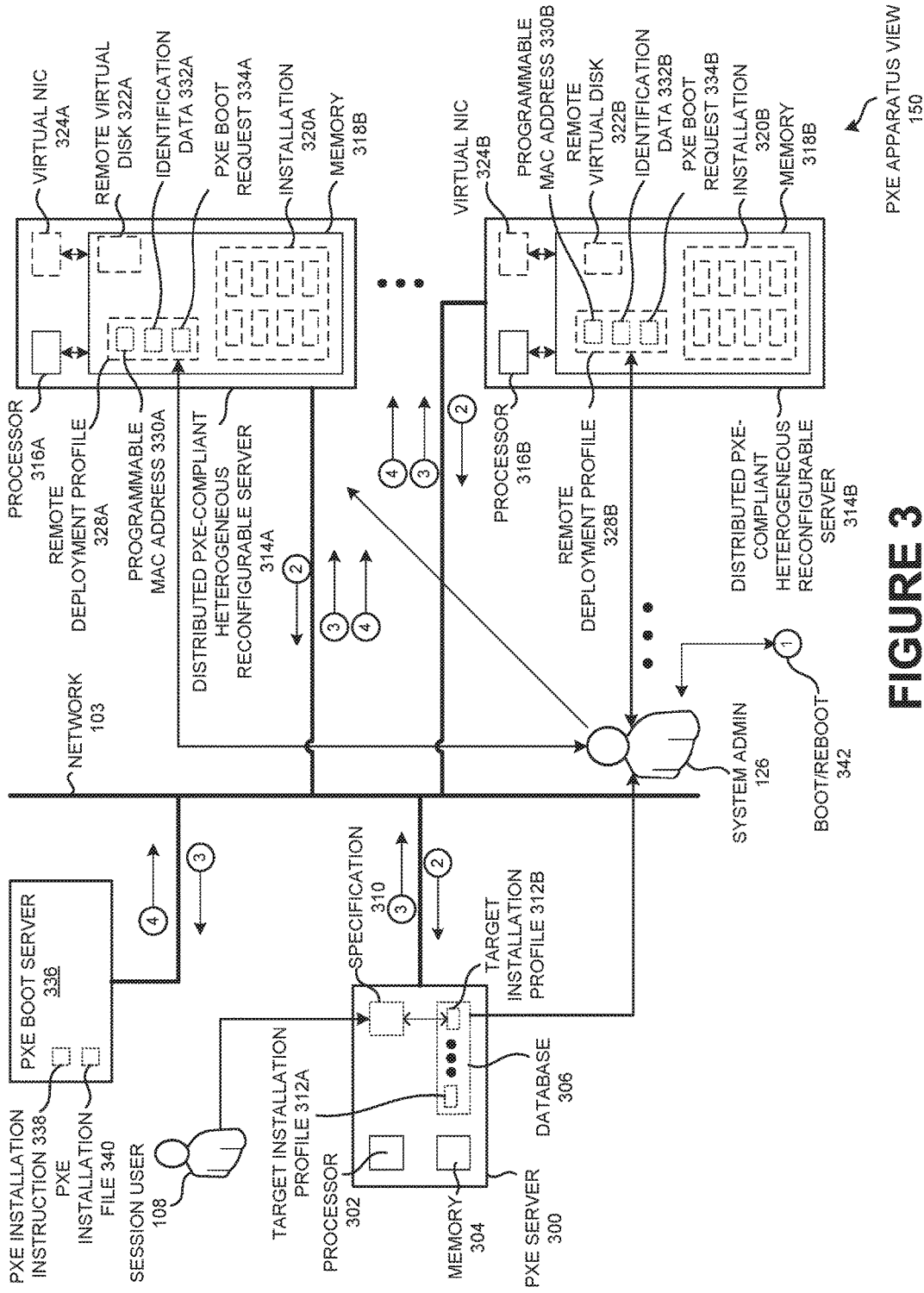
FIG. 3 is a PXE apparatus view illustrating a PXE server configuring a set of more than twenty distributed PXE-compliant heterogeneous reconfigurable servers with a remote virtual disk and a virtual network interface controller (NIC) based on a specification of a session user, according to one embodiment.

FIG. 3 is a PXE apparatus view 350 illustrating a PXE server configuring a set of more than twenty distributed PXE-compliant heterogeneous reconfigurable servers with a remote virtual disk and a virtual network interface controller (NIC) based on a specification of a session user, according to one embodiment.

FIG. 3 particularly includes a PXE server 300, a processor 302, a memory 304, a database 306, a specification 310, a target installation profile 312A, a distributed PXE-compliant heterogeneous reconfigurable server 314, a processor 316, a memory 318, an installation 320, a virtual disk 322, a virtual NIC 324, a remote deployment profile 328, a programmable MAC address 330, an identification data 332, a PXE boot request 334, a PXE boot server 336, a PXE installation instruction 338, a PXE installation file 340, and boot/reboot 342, according to one embodiment.

The PXE server 300 may be a client/server interface that allows networked computers and/or servers (e.g., distributed PXE-compliant heterogeneous reconfigurable server 314) that are not yet loaded with an operating system to be configured and booted remotely by an administrator (e.g., system admin 126). The PXE server 300 may be a standardized client-server environment that boots a software assembly, retrieved from a network, on PXE-enabled clients (e.g., distributed PXE-compliant heterogeneous reconfigurable server 314). The PXE code may be delivered with a new computer on a read-only memory chip or boot disk that allows the computer (e.g., a client, distributed PXE-compliant heterogeneous reconfigurable server 314) to communicate with the network server (e.g., PXE server 300) so that the client machine can be remotely configured and its operating system can be remotely booted, according to one embodiment.

The PXE server 300 may allow the distributed PXE-compliant heterogeneous reconfigurable server 314 to receive an IP address (e.g., identification data 332A, 332B) to gain access to the network servers, according to one embodiment.

The PXE server 300 may be a set of application program interfaces (API) that are used by the distributed PXE-compliant heterogeneous reconfigurable server's 314 Basic Input/Output Operating System (BIOS) or a downloaded Network Bootstrap Program (NBP) that automates the booting (e.g., boot/reboot 342) of the operating system and other configuration steps in the distributed PXE-compliant heterogeneous reconfigurable server 314. The distributed PXE-compliant heterogeneous reconfigurable server 314 may not necessarily need an operating system or even a hard disk to run the system, according to one embodiment.

The distributed PXE-compliant heterogeneous reconfigurable server 314 may be rebooted in the event of hardware and/or software failure. This may allow the system admin 126 to diagnose and perhaps fix the problem in distributed PXE-compliant heterogeneous reconfigurable server 314. The PXE server 300 may add new types of computers easily to the network 103, according to one embodiment.

The PXE server 300 may provide a standard method of initializing the PXE code in the PXE ROM chip and/or boot disk of the distributed PXE-compliant heterogeneous reconfigurable server 314. The PXE server 300 may enable rapid deployment of desktop and server systems within an enterprise using the distributed PXE-compliant heterogeneous reconfigurable server 314. The PXE server 300 may set up a VMware Workstation virtual machine to attempt booting from PXE as its primary boot method, according to one embodiment.

The processor 302 may be a logic circuitry that responds to and processes the basic instructions that drives the PXE server 300. The processor 302 may perform arithmetical, logical, input/output (I/O) and other basic instructions that are passed from an operating system (OS) of the PXE server 300, according to one embodiment.

The memory 304 may be an electronic holding place for instructions and data that PXE server's 300 microprocessor can reach quickly. The memory 304 may be any physical device capable of storing information temporarily and/or permanently in the PXE server 300, according to one embodiment.

The database 306 may be a collection of information for making a program ready for execution that is organized so that it can easily be accessed, managed, and updated by the processor 302 of the PXE server 300. The database 306 may be a specialized program responsible for doing whatever is needed for installation of target installation profile 312B, 312B defined based on the specification 310 of the session user 108 of the PXE server 300. The installation 320A, 320B may be part of a larger software deployment process, according to one embodiment.

The specification 310 may describe the operational and performance requirements of the distributed PXE-compliant heterogeneous reconfigurable server 314. It may be a high-level document that dictates global functions of the distributed PXE-compliant heterogeneous reconfigurable server 314. The specification 310 may be designed to describe the method the BIOS will use to identify and prioritize IPL (Initial Program Load) devices in the distributed PXE-compliant heterogeneous reconfigurable server 314, according to one embodiment.

The system specifications (e.g., specification 310) may help to define the operational and performance guidelines for the distributed PXE-compliant heterogeneous reconfigurable server 314. It may outline how the distributed PXE-compliant heterogeneous reconfigurable server 314 is expected to perform, and what that may include. Key specifications 310 may include interface definitions, document design rules and functional areas for the distributed PXE-compliant heterogeneous reconfigurable server 314. The specifications 310 may determine security access. The session user 108 may offer templates and resources to help facilitate the adherence of system specifications (e.g., specification 310) of the distributed PXE-compliant heterogeneous reconfigurable server 314, according to one embodiment.

The target installation profile 312A may be the objective arithmetical, or graphic summary and/or analysis of a process, activity, relationship, or set of characteristics of the distributed PXE-compliant heterogeneous reconfigurable server 314. The target installation profile 312A, 312B may provide configuration features and functions for a specific type of specification 310 of a session user 108 as a single download containing core, contributed modules, themes, and pre-defined configurations. The target installation profile 312A may make it possible to quickly set up a complex, use-specific computing environment in fewer steps than if installing and configuring elements individually for a system admin 126 of the PXE server 300, according to one embodiment.

The distributed PXE-compliant heterogeneous reconfigurable server 314 may be a computer program and/or a device in a Preboot Execution Environment that provides functionality for other programs and/or collection of autonomous computers linked by a network 103 using software to produce an integrated computing facility, using more than one kind of processor or cores by combining flexibility of software with the high performance of hardware by processing with flexible high speed computing fabrics like field-programmable gate arrays (FPGAs). The PXE server 300 enables booting of the distributed PXE-compliant heterogeneous reconfigurable server 314 from a firmware (e.g., data contained on a read-only-memory (ROM) or programmable read-only-memory (PROM) chip) based on the specification 310 of the session user 108, according to one embodiment.

Each of the set of more than twenty distributed PXE-compliant heterogeneous reconfigurable servers 314 may be identified by a unique programmable media access control (MAC) address 330 associated with at least one virtual NIC 332, according to one embodiment.

The processor 316 may be a logic circuitry that responds to and processes the basic instructions that drives the distributed PXE-compliant heterogeneous reconfigurable server 314. The processor 316A, 316B may perform arithmetical, logical, input/output (I/O) and other basic instructions (e.g., set of BIOS instructions) that are passed from an operating system (OS) of the distributed PXE-compliant heterogeneous reconfigurable server 314, according to one embodiment.

The memory 318 may be an electronic holding place for instructions and data that distributed PXE-compliant heterogeneous reconfigurable server's 314 microprocessor can reach quickly. The memory 318 may be any physical device capable of storing information temporarily and/or permanently in the distributed PXE-compliant heterogeneous reconfigurable server 314, according to one embodiment.

The installation 320 may involve code being copied/generated from the installation files (e.g., PXE installation file 340) to new files on the distributed PXE-compliant heterogeneous reconfigurable server 314 for easier access by the operating system (e.g., heterogeneous operating system 200) of the distributed PXE-compliant heterogeneous reconfigurable server 314A, 314B, according to one embodiment.

The virtual disk 322 may be the software components that emulate an actual disk storage device in the distributed PXE-compliant heterogeneous reconfigurable server 314A, 314B. The virtual disk 322 may be a disk image file format for storing the complete contents of a hard drive. The virtual disk 322 may replicate an existing hard drive and may include all data and structural elements. The virtual disk 322 may be stored anywhere that the distributed PXE-compliant heterogeneous reconfigurable server 314 can access, according to one embodiment.

The virtual NIC 324 may be a network interface controller working in a virtual machine (e.g., heterogeneous virtual machine). Visualizing a physical NIC into a visual NIC can allow a VM to connect to the Internet or bridge to different network 103 segments. The virtual NIC 324A, 324B (e.g., a network interface card, network adapter, LAN adapter, physical network interface) may be a computer hardware component that connects distributed PXE-compliant heterogeneous reconfigurable server 314 to a computer network 103 of the PXE server 300, according to one embodiment.

The remote deployment profile 328 may be brief description of the characteristics of configuration file to load the first piece of software that starts on the distributed PXE-compliant heterogeneous reconfigurable server 314 and complete other configuration steps on the distributed PXE-compliant heterogeneous reconfigurable server 314 based on the specification 310 of the session user 108, according to one embodiment.

The remote deployment profile 328A, 328B may enable start of deploying the applications (e.g., heterogeneous operating system, the heterogeneous hypervisor, the heterogeneous virtual machine, the heterogeneous software and the heterogeneous software license) contemporaneously in the distributed PXE-compliant heterogeneous reconfigurable server 314A, 314B based on the specification 310 of the session user 108 after each boot/reboot 342, according to one embodiment.

The programmable MAC address 330 may be a set of coded instructions that enables a machine, (e.g., distributed PXE-compliant heterogeneous reconfigurable server 314A, 314B) to perform a desired sequence of operations to assign a unique identifier to network interfaces for communications at the data link layer of a network segment, according to one embodiment.

The identification data 332 may be distinct pieces of information, including unique programmable MAC address 330A, 300B, usually formatted in a special way that the PXE server 300 may receive from each of the set of more than twenty distributed PXE-compliant heterogeneous reconfigurable servers 314 through the network 103, according to one embodiment.

A set of instructions may be stored in the memory 304 to be executed by the processor 302 of the PXE server 300. The processor 302 may receive an identification data 332 including the unique programmable MAC address 330 from each of the set of more than twenty distributed PXE-compliant heterogeneous reconfigurable servers 314A, 314B through the network 103. The processor 302 may execute the set of instructions to match the unique programmable MAC address 330 with a target installation profile 312 by searching a database 306. The target installation profile 312 may be defined based on the specification 310 of the session user 108. Further, the processor 302 may execute the set of instructions to process the PXE boot request 334A, 334B from each of the set of more than twenty distributed PXE-compliant heterogeneous reconfigurable servers 314A, 314B. The processor 302 may execute the set of instructions to cause to have PXE installation instructions 338 and PXE installation files 340 be sent to each of the set of more than twenty distributed PXE-compliant heterogeneous reconfigurable servers 314A, 314B by the PXE boot server 336 based on the target installation profile 312, according to one embodiment.

The PXE server 300 may choose a unique MAC address (e.g., MAC address 222) to be the unique programmable MAC address 330 of at least one virtual NIC 324 configured during booting. The same unique MAC address (e.g., MAC address 222) may be chosen to be the MAC address associated with the target installation profile 312 in the database 306 of the PXE server 300. Each of the set of more than twenty distributed PXE-compliant heterogeneous reconfigurable servers 314A, 314B may send the identification data 332 and the PXE boot request 334 to the PXE server 300 based on a stored IP address according to the remote deployment profile 328, according to one embodiment.

The PXE boot request 334 may be the solicitation of making the program ready for execution by the PXE server 300. Each of the distributed PXE-compliant heterogeneous reconfigurable server 314A, 314B may send the identification data 332 including the distinct programmable MAC address 330 and the PXE boot request 334 to the PXE server 300 through a set of BIOS instructions according to the remote deployment profile 328, according to one embodiment.

The PXE boot server 336 allows a workstation to boot from a PXE server 300 on a network 103 prior to booting the operating system on the local hard drive. A PXE-enabled workstation (e.g., distributed PXE-compliant heterogeneous reconfigurable server 314A, 314B) may connect its NIC (e.g., virtual NIC 324A) to the LAN via a jumper, which keeps the workstation connected to the network 103 even when the power is off. Because a network administrator (e.g., system admin 126) does not have to physically visit the specific workstation and manually boot it, operating systems and other software, such as diagnostic programs, can be loaded onto the device (e.g., distributed PXE-compliant heterogeneous reconfigurable server 314A, 314B) from the PXE server 300 over the network 103, according to one embodiment.

The PXE installation instruction 338 may be the basic command given by the PXE boot server 336 to the processor 316A, 316B of the distributed PXE-compliant heterogeneous reconfigurable server 314A, 314B to perform a particular task of installing and/or automatically updating installation of a heterogeneous operating system 200, a heterogeneous hypervisor 202, a heterogeneous virtual machine 204, a heterogeneous software 206 and a heterogeneous software license 208 contemporaneously under the direction of the PXE server 300 based on the specification 310 of the session user 108 without any manual intervention upon the occurrence of a booting event (e.g., using boot/reboot 142), according to one embodiment.

The PXE installation file 340 may be a collection of data and/or information from the PXE boot server 336 sent to the processor 316A, 316B of the distributed PXE-compliant heterogeneous reconfigurable server 314A, 314B to perform a particular task to install a particular program/file in the distributed PXE-compliant heterogeneous reconfigurable server 314A, 314B to prepare for operation, according to one embodiment.

The boot/reboot 342 may be the process of loading the first piece of software that starts a computer, (e.g., distributed PXE-compliant heterogeneous reconfigurable server 314A, 314B). Because the operating system is essential for running all other programs in the distributed PXE-compliant heterogeneous reconfigurable server 314A, 314B, it is usually the first piece of software loaded during the boot process by the PXE server 300, according to one embodiment.

When a particular server of the set of more than twenty distributed PXE-compliant heterogeneous reconfigurable servers 314A, 314B does not execute any existing operating system (e.g., operating system 200), the particular server may send the identification data 332 and the PXE boot request 334 to the PXE server 300 through the set of BIOS instructions. The PXE server 300 may have the PXE boot server 336 to install and execute the heterogeneous operating system 200 in the particular server through the set of BIOS instructions. The PXE server 300 may have the PXE boot server 336 to install and execute the heterogeneous hypervisor 202, the heterogeneous virtual machine 204 and the heterogeneous software 206 in the particular server, according to one embodiment.

The PXE server 300 may include a processor 302 and a memory 304. The memory 304 may be communicatively coupled with the processor 302. The PXE server 300 may include a database 306 communicatively coupled with the processor 302. The PXE server 300 may be communicatively coupled with a set of more than twenty distributed PXE-compliant heterogeneous reconfigurable servers 314A, 314B with corresponding processors 316A, 316B and memories 316A, 316B through a network 103, according to one embodiment.

In circle "1", system admin 126 may key-in a command to perform software boot/reboot 142. In circle "2", set of more than twenty distributed PXE-compliant heterogeneous reconfigurable servers 314A, 314B may send an identification data 332 and a PXE boot request 334 contemporaneously to the PXE server 300. The PXE server 300 may check the unique programmable MAC address 330 in each of the identification data 332 to locate the corresponding target installation profile 312 in the database 306. Based on each target installation profile 312, the PXE server 300 may send direction in circle "3". The direction causes PXE installation instructions 338 and PXE installation files 340 to be sent to each of the set of more than twenty distributed PXE-compliant heterogeneous reconfigurable servers 314A, 314B contemporaneously in circle "4". Each of the set of more than twenty distributed PXE-compliant heterogeneous reconfigurable servers 314A, 314B may perform the installation of the corresponding heterogeneous hypervisors 202 and heterogeneous operating systems 200, according to one embodiment.

Figure 4:
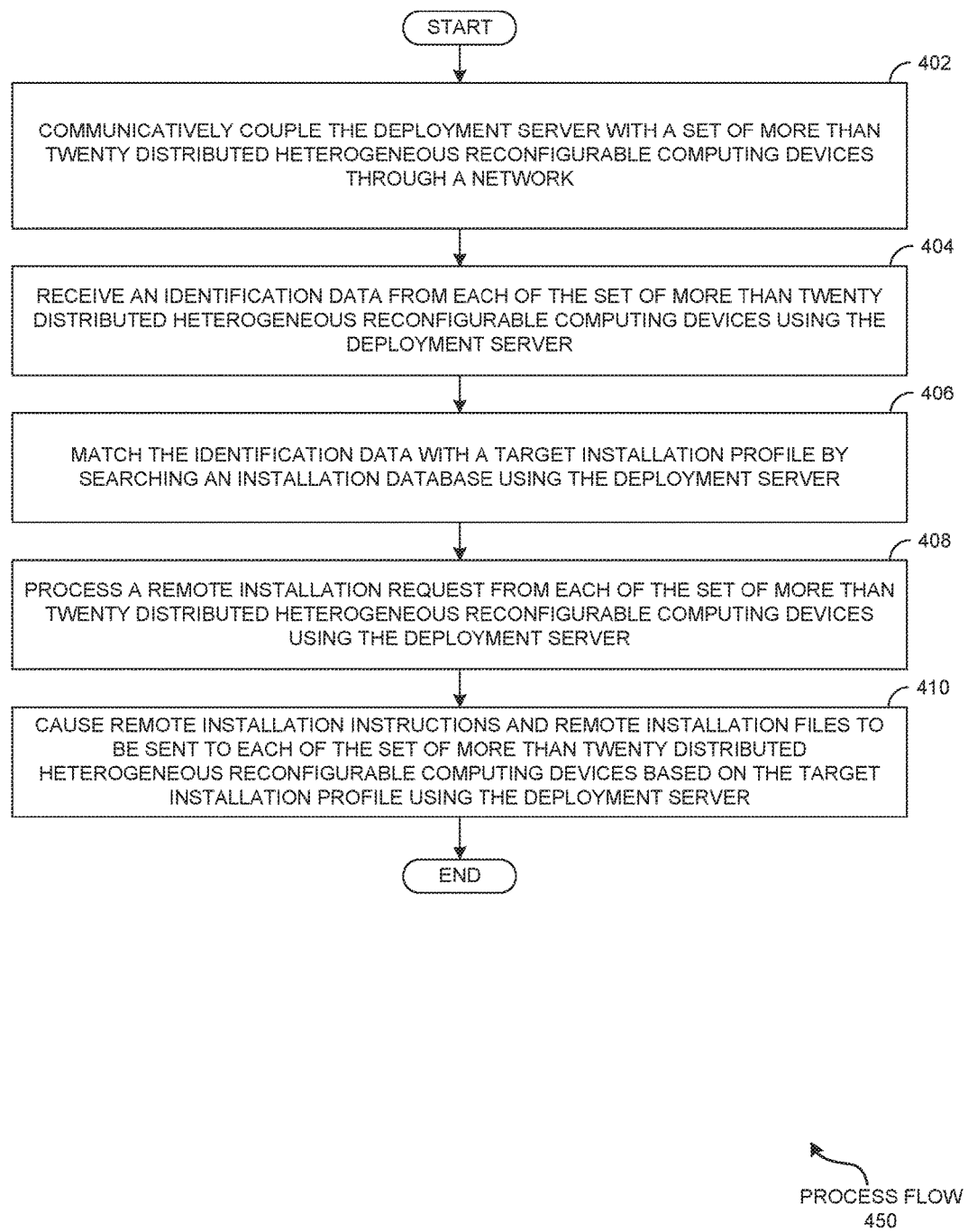
FIG. 4 illustrates a process flow to cause to have remote installation instructions and remote installation files sent to each of the set of more than twenty distributed heterogeneous reconfigurable computing devices based on the target installation profile using the deployment server of FIG. 1, according to one embodiment.

FIG. 4 illustrates a process flow 450 to cause to have the remote installation instructions 138 and remote installation files 140 sent to each of the set of more than twenty distributed heterogeneous reconfigurable computing devices 114A, 114B based on the target installation profile 112A, 112B using the deployment server 100 of FIG. 1, according to one embodiment.

In operation 402, the deployment server 100 may be communicatively coupled to the set of more than twenty distributed heterogeneous reconfigurable computing devices 114A, 114B through a network 103. In operation 404, the deployment server 100 may receive an identification data 132A, 132B from each of the set of more than twenty distributed heterogeneous reconfigurable computing devices 114A, 114B. In operation 406, the deployment server 100 may match the identification data 132A, 132B with a target installation profile 112A, 112B by searching an installation database 106, according to one embodiment.

In operation 408, the deployment server 100 may process a remote installation request 134A, 134B from each of the set of more than twenty distributed heterogeneous reconfigurable computing devices 114A, 114B. In operation 410, the deployment server 100 may cause the remote installation instructions 138 and remote installation files 140 to be sent to each of the set of more than twenty distributed heterogeneous reconfigurable computing devices 114A, 114B based on the target installation profile 112A, 112B, according to one embodiment.

Figure 5:
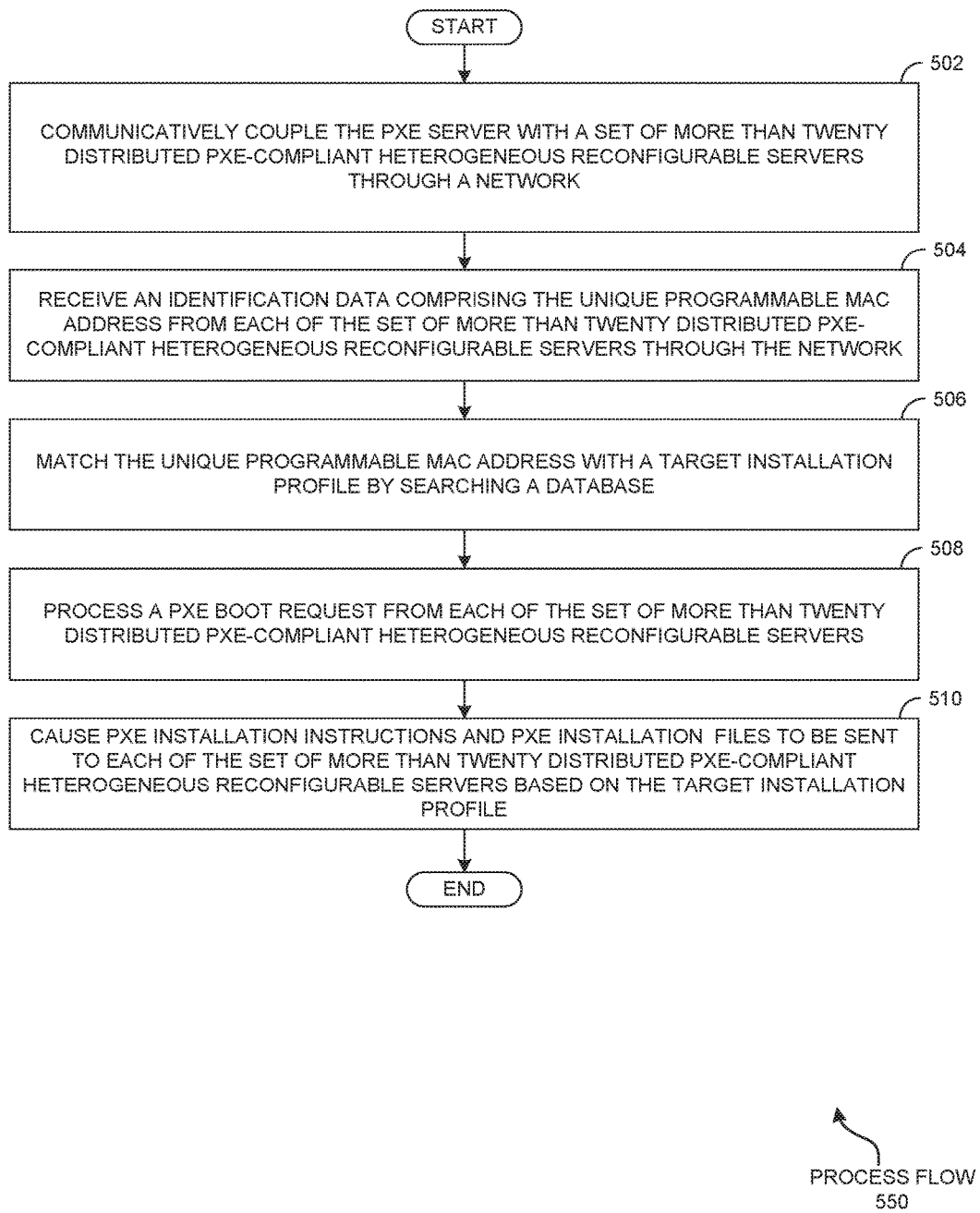
FIG. 5 is a process flow to illustrate the processing of a PXE boot request from each of the set of more than twenty distributed PXE-compliant heterogeneous reconfigurable servers by the PXE server of FIG. 3, according to one embodiment, according to one embodiment.

FIG. 5 is a process flow 550 to illustrate the processing of a PXE boot request from each of the set of more than twenty distributed PXE-compliant heterogeneous reconfigurable servers 314A, 314B by the PXE server 300 of FIG. 3, according to one embodiment.

In operation 502, the PXE server 300 may be communicatively coupled with a set of more than twenty distributed PXE-compliant heterogeneous reconfigurable servers 314A, 314B through a network 103, according to one embodiment.

In operation 504, the PXE server 300 may receive an identification data 332A, 332B including the unique programmable MAC address 330A, 330B from each of the set of more than twenty distributed PXE-compliant heterogeneous reconfigurable servers 314A, 314B through the network 103, according to one embodiment.

In operation 506, the PXE server 300 may match the unique programmable MAC address 330A, 330B with a target installation profile 312A, 312B by searching a database 306, according to one embodiment.

In operation 508, the PXE server 300 may process a PXE boot request from each of the set of more than twenty distributed PXE-compliant heterogeneous reconfigurable servers, according to one embodiment.

In operation 510, the PXE server 300 may cause PXE installation instructions and PXE installation files to be sent to each of the set of more than twenty distributed PXE-compliant heterogeneous reconfigurable servers 314A, 314B based on the target installation profile 312A, 312B, according to one embodiment.

Figure 6:
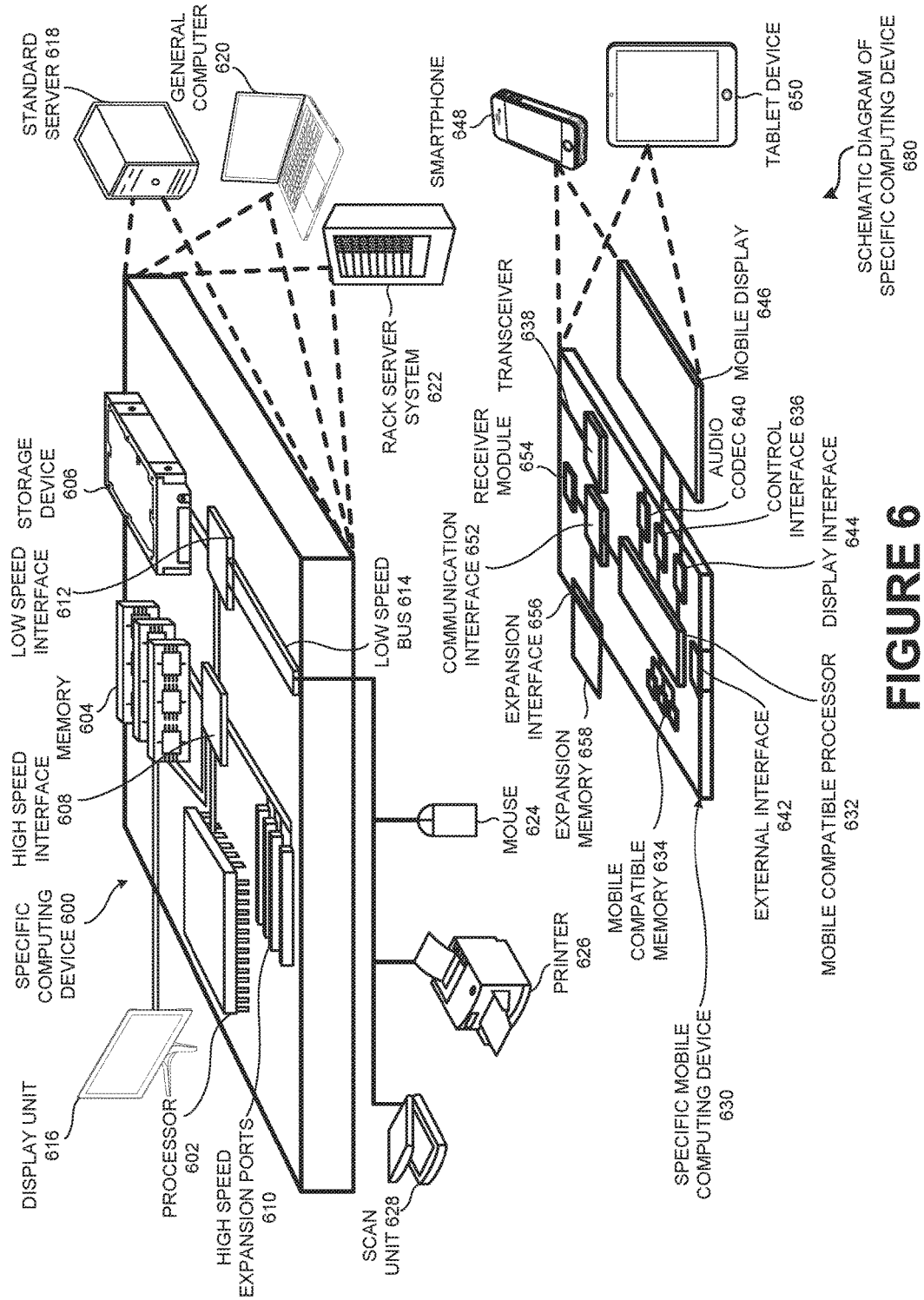
FIG. 6 is a schematic diagram of exemplary data processing devices that can be used to implement the methods and systems disclosed herein, according to one embodiment.

FIG. 6 is a schematic diagram of specific computing device 680 and a specific mobile computing device 630 that can be used to perform and/or implement any of the embodiments disclosed herein. In one or more embodiments, the deployment server 100, the distributed heterogeneous reconfigurable computing device(s) 114A, 114B, and/or installation server 136 illustrated in FIG. 1 may be the specific computing device 600. In another example embodiment, the PXE server 300, the distributed PXE-compliant heterogeneous reconfigurable sever(s) 314A, 314B, and/or PXE boot server 336 illustrated in FIG. 3 may be the specific computing device 600.

The specific computing device 600 may represent various forms of digital computers, such as laptops, desktops, workstations, personal digital assistants, servers, blade servers, mainframes, and/or other appropriate computers. The specific mobile computing device 630 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 600 may include a processor 602, a memory 604, a storage device 606, a high speed interface 608 coupled to the memory 604 and a plurality of high speed expansion ports 610, and a low speed interface 612 coupled to a low speed bus 614 and a storage device 606. In one embodiment, each of the components heretofore may be inter-coupled using various buses, and may be mounted on a common motherboard and/or in other manners as appropriate. The processor 602 may process instructions for execution in the specific computing device 600, including instructions stored in the memory 604 and/or on the storage device 606 to display a graphical information for a GUI on an external input/output device, such as a display unit 616 coupled to the high speed interface 608, according to one embodiment.

In other embodiments, multiple processors and/or multiple buses may be used, as appropriate, along with multiple memories and/or types of memory. Also, a plurality of specific computing device 600 may be coupled with, with each device providing portions of the necessary operations (e.g., as a server bank, a group of blade servers, and/or a multi-processor system).

The memory 604 may be coupled to the specific computing device 600. In one embodiment, the memory 604 may be a volatile memory. In another embodiment, the memory 604 may be a non-volatile memory. The memory 604 may also be another form of computer-readable medium, such as a magnetic and/or an optical disk. The storage device 606 may be capable of providing mass storage for the specific computing device 600. In one embodiment, the storage device 606 may be includes a floppy disk device, a hard disk device, an optical disk device, a tape device, a flash memory and/or other similar solid state memory device. In another embodiment, the storage device 606 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 604, the storage device 606, a memory coupled to the processor 602, and/or a propagated signal.

The high speed interface 608 may manage bandwidth-intensive operations for the specific computing device 600, while the low speed interface 612 may manage lower bandwidth-intensive operations. Such allocation of functions is exemplary only. In one embodiment, the high speed interface 608 may be coupled to the memory 604, the display unit 616 (e.g., through a graphics processor and/or an accelerator), and to the plurality of high speed expansion ports 610, which may accept various expansion cards.

In the embodiment, the low speed interface 612 may be coupled to the storage device 606 and the low speed bus 614. The low speed bus 614 may be comprised of a wired and/or wireless communication port (e.g., a Universal Serial Bus ("USB"), a Bluetooth® port, an Ethernet port, and/or a wireless Ethernet port). The low speed bus 614 may also be coupled to the scan unit 628, a printer 626, a keyboard, a mouse 624, and a networking device (e.g., a switch and/or a router) through a network adapter.

The specific computing device 600 may be implemented in a number of different forms, as shown in the figure. In one embodiment, the specific computing device 600 may be implemented as a standard server 618 and/or a group of such servers. In another embodiment, the specific computing device 600 may be implemented as part of a rack server system 622. In yet another embodiment, the specific computing device 600 may be implemented as a general computer 620 such as a laptop or desktop computer. Alternatively, a component from the specific computing device 600 may be combined with another component in a specific mobile computing device 630. In one or more embodiments, an entire system may be made up of a plurality of specific computing device 600 and/or a plurality of specific computing device 600 coupled to a plurality of specific mobile computing device 630.

In one embodiment, the specific mobile computing device 630 may include a mobile compatible processor 632, a mobile compatible memory 634, and an input/output device such as a mobile display 646, a communication interface 652, and a transceiver 638, among other components. The specific mobile computing device 630 may also be provided with a storage device, such as a microdrive or other device, to provide additional storage. In one embodiment, the components indicated heretofore are inter-coupled using various buses, and several of the components may be mounted on a common motherboard.

The mobile compatible processor 632 may execute instructions in the specific mobile computing device 630, including instructions stored in the mobile compatible memory 634. The mobile compatible processor 632 may be implemented as a chipset of chips that include separate and multiple analog and digital processors. The mobile compatible processor 632 may provide, for example, for coordination of the other components of the specific mobile computing device 630, such as control of user interfaces, applications run by the specific mobile computing device 630, and wireless communication by the specific mobile computing device 630.

The mobile compatible processor 632 may communicate with a user through the control interface 636 and the display interface 644 coupled to a mobile display 646. In one embodiment, the mobile display 646 may be a Thin-Film-Transistor Liquid Crystal Display ("TFT LCD"), an Organic Light Emitting Diode ("OLED") display, and another appropriate display technology. The display interface 644 may comprise appropriate circuitry for driving the mobile display 646 to present graphical and other information to a user. The control interface 636 may receive commands from a user and convert them for submission to the mobile compatible processor 632.

In addition, an external interface 642 may be provide in communication with the mobile compatible processor 632, so as to enable near area communication of the specific mobile computing device 630 with other devices. External interface 642 may provide, for example, for wired communication in some embodiments, or for wireless communication in other embodiments, and multiple interfaces may also be used.

The mobile compatible memory 634 may be coupled to the specific mobile computing device 630. The mobile compatible memory 634 may be implemented as a volatile memory and a non-volatile memory. The expansion memory 658 may also be coupled to the specific mobile computing device 630 through the expansion interface 656, which may comprise, for example, a Single In Line Memory Module ("SIMM") card interface. The expansion memory 658 may provide extra storage space for the specific mobile computing device 630, or may also store an application or other information for the specific mobile computing device 630.

Specifically, the expansion memory 658 may comprise instructions to carry out the processes described above. The expansion memory 658 may also comprise secure information. For example, the expansion memory 658 may be provided as a security module for the specific mobile computing device 630, and may be programmed with instructions that permit secure use of the specific mobile computing device 630. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 634, the expansion memory 658, a memory coupled to the mobile compatible processor 632, and a propagated signal that may be received, for example, over the transceiver 638 and/or the external interface 642.

The specific mobile computing device 630 may communicate wirelessly through the communication interface 652, which may be comprised of a digital signal processing circuitry. The communication interface 652 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 638 (e.g., radio-frequency transceiver). In addition, short-range communication may occur, such as using a Bluetooth®, Wi-Fi, and/or other such transceiver. In addition, a GPS ("Global Positioning System") receiver module 654 may provide additional navigation-related and location-related wireless data to the specific mobile computing device 630, which may be used as appropriate by a software application running on the specific mobile computing device 630.

The specific mobile computing device 630 may also communicate audibly using an audio codec 640, which may receive spoken information from a user and convert it to usable digital information. The audio codec 640 may likewise generate audible sound for a user, such as through a speaker (e.g., in a handset smartphone of the specific mobile computing device 630). Such a sound may comprise a sound from a voice telephone call, a recorded sound (e.g., a voice message, a music files, etc.) and may also include a sound generated by an application operating on the specific mobile computing device 630.

The specific mobile computing device 630 may be implemented in a number of different forms, as shown in the figure. In one embodiment, the specific mobile computing device 630 may be implemented as a smartphone 648. In another embodiment, the specific mobile computing device 630 may be implemented as a personal digital assistant ("PDA"). In yet another embodiment, the specific mobile computing device, 630 may be implemented as a tablet device 650.

An example embodiment may now be described. Peter is a system administrator (e.g. system admin 126) of a server farm company GOEGLE with 10000 server computers (e.g. distributed heterogeneous reconfigurable computing device 114A-114B) available to serve volume customers. The 10000 server computers are heterogeneous as 5000 servers with older hardware were purchased one year ago and the other 5000 with faster hardware were purchased two months ago. The 10000 server computers are distributed as the 5000 servers with older hardware are housed in a data center in New York and the 5000 servers with faster hardware are housed in a new data center in Arizona. Each server computer is a server blade housed in 19-in server rack. Each server computer (e.g. distributed heterogeneous reconfigurable computing device 114A) is configurable with flexible amount of virtual NIC (e.g. 124A), programmable MAC address (e.g. 130A) and flexible amount of virtual disk (122A) of SAN (storage area network 220). Each server is bootable from SAN. Each server is PXE compliant such that it is PXE bootable from a PXE server (deployment server 100).

After ABC Bank (a previous session user 108) finishes a session using 3000 server computers, the 3000 server computers 114 are assigned to serve a next session user 108 AMASON. AMASON wants 1000 servers 114 with VMware ESXi hypervisor, 700 servers 114 with Xen hypervisor and 1300 servers 114 with KVM hypervisors.

Instead of reconfiguring the 3000 servers manually one-at-a-time which may take many hours, Peter uses the current invention to automatically deploy (i.e. update installation 120A of) the 3000 computer servers. From his past records, Peter finds three templates of target installation profile (112), one for servers with VMware ESXI hypervisors (e.g. heterogeneous hypervisor 202), one for servers with Xen hypervisors and one for servers with KVM hypervisors. He slightly modifies the three templates, and generates 3000 target installation profiles for the 3000 server computers based on the three target installation profile templates. Each of the 3000 server computers has a unique programmable MAC address (e.g. 130) that the PXE-compliant deployment server (deployment server 100) of GOEGLE stores in the installation database 106 and uses to identify the individual server. The 3000 server computers are PXE compliant and have the boot sequence (remote deployment boot profile 128) set up such that, upon booting (e.g. boot/reboot 142), they will perform remote PXE boot.

Having the simple preparation finished, Peter (e.g. system admin 126) keys in a command to perform software reboot on the 3000 server computers in circle "1". Upon rebooting (e.g. boot/reboot 142), each of all server computers (114) sends an identification data 132 and an installation request 134 concurrently to the deployment server 100 in circle "2". The deployment server 100 checks the unique programmable MAC address 130 in each of the identification data 132 to locate the corresponding target installation profile 112 in the installation database 106. Based on each target installation profile 112, the deployment server 100 sends direction in circle "3". The direction causes remote installation instructions 138 and remote installation files 140 to be send to the individual server computers 114 contemporaneously in circle "4". All the server computers 114 perform the installation of the corresponding heterogeneous hypervisors 202 and heterogeneous operating systems 200.

After a short 10-minute tea-break, all the installations are finished and Peter comes back and finds all the 3000 server computers configured exactly as required by the session user AMASON. Peter hands the 3000 server computers over to AMASON. AMASON is very happy that GOEGLE manages to set up the 3000 server computers exactly as requested in just a short 10 minutes. AMASON commences its urgent computational operations using the 3000 server computers in a timely manner and decides to come back to GOEGLE in the future for any server farm needs.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A preboot execution environment (PXE) server comprising:

a processor;

a memory communicatively coupled with the processor, wherein the PXE server is communicatively coupled with a set of more than twenty distributed PXE-compliant heterogeneous reconfigurable servers through a network, wherein each of the set of more than twenty distributed PXE-compliant heterogeneous reconfigurable servers needs to automatically update installation of at least one of a heterogeneous operating system, a heterogeneous hypervisor, a heterogeneous virtual machine, a heterogeneous software and a heterogeneous software license contemporaneously under the direction of the PXE server based on a specification of a session user of the set of more than twenty distributed PXE-compliant heterogeneous reconfigurable servers without manual intervention upon the occurrence of a booting event, wherein each of the set of more than twenty distributed PXE-compliant heterogeneous reconfigurable servers to be configured with at least one remote virtual disk and at least one virtual network interface controller (NIC) based on the specification of the session user of the set of more than twenty distributed PXE-compliant heterogeneous reconfigurable servers, and wherein each of the set of more than twenty distributed PXE-compliant heterogeneous reconfigurable servers to be identified by a unique programmable media access control (MAC) address associated with the at least one virtual NIC; and a set of instructions stored in the memory to be executed by the processor to:

receive an identification data comprising the unique programmable MAC address from each of the set of more than twenty distributed PXE-compliant heterogeneous reconfigurable servers through the network, match the unique programmable MAC address with a target installation profile by searching a database,
wherein the target installation profile to be defined based on the specification of the session user, process a PXE boot request from each of the set of more than twenty distributed PXE-compliant heterogeneous reconfigurable servers, and cause to have PXE installation instructions and PXE installation files sent to each of the set of more than twenty distributed PXE-compliant heterogeneous reconfigurable servers based on the target installation profile, wherein each of the set of more than twenty distributed PXE-compliant heterogeneous reconfigurable servers to perform booting and to be configured with the at least one remote virtual disk and the at least one virtual NIC with the unique programmable MAC address according to a remote deployment profile based on the specification of the session user, wherein the each of the set of more than twenty distributed PXE-compliant heterogeneous reconfigurable servers to send the identification data comprising the unique programmable MAC address and the PXE boot request to the PXE server through a set of BIOS instructions according to the remote deployment profile, and wherein each of the set of more than twenty distributed PXE-compliant heterogeneous reconfigurable servers to conduct installation of the at least one of the heterogeneous operating system, the heterogeneous hypervisor, the heterogeneous virtual machine, the heterogeneous software and the heterogeneous software license contemporaneously under the direction of the PXE server based on the PXE installation instructions and PXE installation files.

2. The PXE server in claim 1:
wherein each of the set of more than twenty distributed PXE-compliant heterogeneous reconfigurable servers is freshly powered up before communicating the identification data and the PXE boot request to the PXE server.

3. The PXE server in claim 1:
wherein each of the set of more than twenty distributed PXE-compliant heterogeneous reconfigurable servers to perform at least one of a hardware reboot and a software reboot before sending the identification data and the PXE boot request to the PXE server.

4. The PXE server in claim 1:
wherein the each of the set of more than twenty distributed PXE-compliant heterogeneous reconfigurable servers to conduct installation of the at least one of the heterogeneous operating system, the heterogeneous hypervisor, the heterogeneous virtual machine, the heterogeneous software and the heterogeneous software license contemporaneously under the direction of the PXE server based on the at least one remote virtual disk and the at least one virtual NIC with the unique programmable MAC address.

5. The PXE server in claim 4:
wherein a unique MAC address is chosen to be the unique programmable MAC address of the at least one virtual NIC configured during booting, and
wherein the same unique MAC address is chosen to be a MAC address associated with the target installation profile in the database of the PXE server.

6. The PXE server in claim 4:
wherein each of the set of more than twenty distributed PXE-compliant heterogeneous reconfigurable servers to send the identification data and the PXE boot request to the PXE server based on a stored IP address according to the remote deployment profile.

7. The PXE server in claim 1:
wherein a particular server of the set of more than twenty distributed PXE compliant heterogeneous reconfigurable servers does not execute any existing operating system,
wherein the particular server to send the identification data and the PXE boot request to the PXE server through the set of BIOS instructions,
wherein the heterogeneous operating system is installed and executed in the particular server,
wherein the heterogeneous hypervisor is installed and executed in the particular server, and
wherein the heterogeneous virtual machine and the heterogeneous software are installed in the particular server.

8. A method of a preboot execution environment (PXE) server comprising:
communicatively coupling the PXE server with a set of more than twenty distributed PXE-compliant heterogeneous reconfigurable servers through a network,
wherein each of the set of more than twenty distributed PXE-compliant heterogeneous reconfigurable servers needs to automatically update installation of at least one of a heterogeneous operating system, a heterogeneous hypervisor, a heterogeneous virtual machine, a heterogeneous software and a heterogeneous software license contemporaneously under the direction of the PXE server based on a specification of a session user of the set of more than twenty distributed PXE-compliant heterogeneous reconfigurable servers without manual intervention upon the occurrence of a booting event,
wherein each of the set of more than twenty distributed PXE-compliant heterogeneous reconfigurable servers to be configured with at least one remote virtual disk and at least one virtual network interface controller (NIC) based on the specification of the session user of the set of more than twenty distributed PXE-compliant heterogeneous reconfigurable servers, and
wherein each of the set of more than twenty distributed PXE-compliant heterogeneous reconfigurable servers to be identified by a unique programmable media access control (MAC) address associated with the at least one virtual NIC;
receiving an identification data comprising the unique programmable MAC address from each of the set of more than twenty distributed PXE-compliant heterogeneous reconfigurable servers through the network;
matching the unique programmable MAC address with a target installation profile by searching a database,
wherein the target installation profile to be defined based on the specification of the session user;
processing a PXE boot request from each of the set of more than twenty distributed PXE-compliant heterogeneous reconfigurable servers; and causing PXE installation instructions and PXE installation files to be sent to each of the set of more than twenty distributed PXE-compliant heterogeneous reconfigurable servers based on the target installation profile, wherein each of the set of more than twenty distributed PXE-compliant heterogeneous reconfigurable servers to perform booting and to be configured with the at least one remote virtual disk and the at least one virtual NIC with the unique programmable MAC address according to a remote deployment profile based on the specification of the session user, wherein the each of the set of more than twenty distributed PXE-compliant heterogeneous reconfigurable servers to send the identification data comprising the unique programmable MAC address and the PXE boot request to the PXE server through a set of BIOS instructions according to the remote deployment profile, and wherein each of the set of more than twenty distributed PXE-compliant heterogeneous reconfigurable servers to effect installation of the at least one of the heterogeneous operating system, the heterogeneous hypervisor, the heterogeneous virtual machine, the heterogeneous software and the heterogeneous software license contemporaneously under the direction of the PXE server based on the PXE installation instructions and PXE installation files.

9. The method of a PXE server in claim 8:
wherein each of the set of more than twenty distributed PXE-compliant heterogeneous reconfigurable servers is freshly powered up before communicating the identification data and the PXE boot request to the PXE server.

10. The method of a PXE server in claim 8:
wherein each of the set of more than twenty distributed PXE-compliant heterogeneous reconfigurable servers to perform at least one of a hardware reboot and a software reboot before sending the identification data and the PXE boot request to the PXE server.

11. The method of a PXE server in claim 8:
wherein the each of the set of more than twenty distributed PXE-compliant heterogeneous reconfigurable servers to refresh installation of the at least one of the heterogeneous operating system, the heterogeneous hypervisor, the heterogeneous virtual machine, the heterogeneous software and the heterogeneous software license contemporaneously under the direction of the PXE server based on the at least one remote virtual disk and the at least one virtual NIC with the unique programmable MAC address.

12. The method of a PXE server in claim 11:
wherein a unique MAC address is chosen to be the unique programmable MAC address of the at least one virtual NIC configured during booting, and wherein the same unique MAC address is chosen to be a MAC address associated with the target installation profile in the database of the PXE server.

13. The method of a PXE server in claim 8:
wherein a particular server of the set of more than twenty distributed PXE-compliant heterogeneous reconfigurable servers does not execute any existing operating system, wherein the particular server to send the identification data and the PXE boot request to the PXE server through the set of BIOS instructions, wherein the heterogeneous operating system is installed and executed in the particular server, wherein the heterogeneous hypervisor is installed and executed in the particular server, and wherein the heterogeneous virtual machine and the heterogeneous software are installed in the particular server.

* * * * *